US012632376B2

(12) United States Patent
Feng

(10) Patent No.: US 12,632,376 B2
(45) Date of Patent: May 19, 2026

(54) MEMORY SYSTEMS AND OPERATION METHODS THEREOF AND STORAGE DEVICES AND OPERATION METHODS THEREOF

(71) Applicant: Yangtze Memory Technologies Co., Ltd., Hubei (CN)

(72) Inventor: Yufei Feng, Hubei (CN)

(73) Assignee: Yangzte Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/766,226

(22) Filed: Jul. 8, 2024

(65) Prior Publication Data

US 2025/0298741 A1  Sep. 25, 2025

(30) Foreign Application Priority Data

Mar. 20, 2024  (CN) .......................... 202410324106.0

(51) Int. Cl.
G06F 12/02 (2006.01)

(52) U.S. Cl.
CPC .................... G06F 12/0246 (2013.01); *G06F 2212/7201* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 9,830,257 B1* | 11/2017 | Booth | ................ | G11C 14/0018 |
| 2010/0172180 A1* | 7/2010 | Paley | ................ | G11C 16/0483 |
| | | | | 365/185.11 |
| 2013/0219107 A1* | 8/2013 | Lee | ..................... | G11C 11/5628 |
| | | | | 711/E12.008 |
| 2020/0192796 A1* | 6/2020 | Lee | ..................... | G06F 12/0646 |
| 2022/0083221 A1* | 3/2022 | Agarwal | .............. | G06F 3/0619 |
| 2022/0326858 A1* | 10/2022 | Luo | ........................ | G06F 3/0619 |
| 2024/0111422 A1* | 4/2024 | Balakrishnan | ........ | G06F 3/0652 |
| 2024/0134747 A1* | 4/2024 | Lee | ........................ | G06F 3/0647 |
| 2024/0394182 A1* | 11/2024 | Aa | ........................ | G06F 3/0679 |

* cited by examiner

*Primary Examiner* — Nathan Sadler
(74) *Attorney, Agent, or Firm* — Hanley, Flight & Zimmerman, LLC

(57) ABSTRACT

Examples of the present disclosure disclose a memory system and an operation method thereof and a storage device and an operation method thereof. The memory system includes a memory device and a memory controller, the $k^{th}$ memory blocks in memory planes in the memory device form one super memory block, super memory blocks form one virtual memory block, the $m^{th}$ physical pages coupled with the $n^{th}$ word lines in the memory planes from a same super memory block in the virtual memory block form one virtual physical page, the virtual physical pages from super memory blocks in a same virtual memory block form one strip; and the memory controller is configured to: receive memory data that needs to be written to a strip; generate parity check data of the strip according to the memory data; and send the memory data and the parity check data to the memory device.

20 Claims, 22 Drawing Sheets

| WL | Vitrual String | CE0 | | | | | | | | | | | | | | | | CE1 | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | CH0 | | | | CH1 | | | | CH2 | | | | CH3 | | | | CH0 | | | | CH1 | | | | CH2 | | | | CH3 | | | |
| | | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 |
| 0 | 0 | S | X | X | X | X | X | X | X | X | X | X | X | X | X | X | X | X | X | X | X | X | X | X | X | X | X | X | X | X | X | X | X |
| | 1 | X | X | X | X | X | X | X | X | X | X | X | X | X | X | X | X | X | X | X | X | X | X | X | X | X | X | X | X | X | X | X | P |
| | 2 | S | X | X | X | X | X | X | X | X | X | X | X | X | X | X | X | X | X | X | X | X | X | X | X | X | X | X | X | X | X | X | X |
| | 3 | X | X | X | X | X | X | X | X | X | X | X | X | X | X | X | X | X | X | X | X | X | X | X | X | X | X | X | X | X | X | X | P |
| | 4 | S | X | X | X | X | X | X | X | X | X | X | X | X | X | X | X | X | X | X | X | X | X | X | X | X | X | X | X | X | X | X | X |
| | 5 | X | X | X | X | X | X | X | X | X | X | X | X | X | X | X | X | X | X | X | X | X | X | X | X | X | X | X | X | X | X | X | P |
| | 6 | S | X | X | X | X | X | X | X | X | X | X | X | X | X | X | X | X | X | X | X | X | X | X | X | X | X | X | X | X | X | X | X |
| | 7 | X | X | X | X | X | X | X | X | X | X | X | X | X | X | X | X | X | X | X | X | X | X | X | X | X | X | X | X | X | X | X | P |
| | 8 | S | X | X | X | X | X | X | X | X | X | X | X | X | X | X | X | X | X | X | X | X | X | X | X | X | X | X | X | X | X | X | X |
| | 9 | X | X | X | X | X | X | X | X | X | X | X | X | X | X | X | X | X | X | X | X | X | X | X | X | X | X | X | X | X | X | X | P |
| | 10 | S | X | X | X | X | X | X | X | X | X | X | X | X | X | X | X | X | X | X | X | X | X | X | X | X | X | X | X | X | X | X | X |
| | 11 | X | X | X | X | X | X | X | X | X | X | X | X | X | X | X | X | X | X | X | X | X | X | X | X | X | X | X | X | X | X | X | P |

10

62

66

64

Peripheral circuit

34

Die RAIN

| WL | String | CE0 | | | | | | | | | | | | | | | | CE1 | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | CH0 | | | | CH1 | | | | CH2 | | | | CH3 | | | | CH0 | | | | CH1 | | | | CH2 | | | | CH3 | | | |
| | | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 |
| 0 | 0 | S | S | S | S | X | X | X | X | X | X | X | X | X | X | X | X | X | X | X | X | X | X | X | X | X | X | X | X | P | P | P | P |

FIG. 2

Plane RAIN

| WL | String | CE0 | | | | | | | | | | | | | | | | CE1 | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | CH0 | | | | CH1 | | | | CH2 | | | | CH3 | | | | CH0 | | | | CH1 | | | | CH2 | | | | CH3 | | | |
| | | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 |
| 0 | 0 | S | X | X | X | X | X | X | X | X | X | X | X | X | X | X | X | X | X | X | X | X | X | X | X | X | X | X | X | X | X | X | P |
| | 1 | S | X | X | X | X | X | X | X | X | X | X | X | X | X | X | X | X | X | X | X | X | X | X | X | X | X | X | X | X | X | X | P |
| | 2 | S | X | X | X | X | X | X | X | X | X | X | X | X | X | X | X | X | X | X | X | X | X | X | X | X | X | X | X | X | X | X | P |

Half-WL RAIN

FIG. 5

2-WL RAIN

| WL | String | CE0 | | | | | | | | | | | | | | | | CE1 | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | CH0 | | | | CH1 | | | | CH2 | | | | CH3 | | | | CH0 | | | | CH1 | | | | CH2 | | | | CH3 | | | |
| | | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 | P0 | P1 | P2 | P3 |
| 0 | 0 | S | X | X | X | X | X | X | X | X | X | X | X | X | X | X | X | X | X | X | X | X | X | X | X | X | X | X | X | X | X | X | X |
| | 1 | S | X | X | X | X | X | X | X | X | X | X | X | X | X | X | X | X | X | X | X | X | X | X | X | X | X | X | X | X | X | X | X |
| | 2 | S | X | X | X | X | X | X | X | X | X | X | X | X | X | X | X | X | X | X | X | X | X | X | X | X | X | X | X | X | X | X | X |
| | 3 | S | X | X | X | X | X | X | X | X | X | X | X | X | X | X | X | X | X | X | X | X | X | X | X | X | X | X | X | X | X | X | X |
| | 4 | S | X | X | X | X | X | X | X | X | X | X | X | X | X | X | X | X | X | X | X | X | X | X | X | X | X | X | X | X | X | X | X |
| | 5 | S | X | X | X | X | X | X | X | X | X | X | X | X | X | X | X | X | X | X | X | X | X | X | X | X | X | X | X | X | X | X | X |
| 1 | 0 | X | X | X | X | X | X | X | X | X | X | X | X | X | X | X | X | X | X | X | X | X | X | X | X | X | X | X | X | X | X | X | P |
| | 1 | X | X | X | X | X | X | X | X | X | X | X | X | X | X | X | X | X | X | X | X | X | X | X | X | X | X | X | X | X | X | X | P |
| | 2 | X | X | X | X | X | X | X | X | X | X | X | X | X | X | X | X | X | X | X | X | X | X | X | X | X | X | X | X | X | X | X | P |
| | 3 | X | X | X | X | X | X | X | X | X | X | X | X | X | X | X | X | X | X | X | X | X | X | X | X | X | X | X | X | X | X | X | P |
| | 4 | X | X | X | X | X | X | X | X | X | X | X | X | X | X | X | X | X | X | X | X | X | X | X | X | X | X | X | X | X | X | X | P |
| | 5 | X | X | X | X | X | X | X | X | X | X | X | X | X | X | X | X | X | X | X | X | X | X | X | X | X | X | X | X | X | X | X | P |

FIG. 6

Half-WL RAIN

| WL | String | CE0 CH0 P0 | P1 | P2 | P3 | CE0 CH1 P0 | P1 | P2 | P3 | CE0 CH2 P0 | P1 | P2 | P3 | CE0 CH3 P0 | P1 | P2 | P3 | CE1 CH0 P0 | P1 | P2 | P3 | CE1 CH1 P0 | P1 | P2 | P3 | CE1 CH2 P0 | P1 | P2 | P3 | CE1 CH3 P0 | P1 | P2 | P3 |
|---|---|---|---|---|---|---|---|---|---|---|---|---|---|---|---|---|---|---|---|---|---|---|---|---|---|---|---|---|---|---|---|---|---|
| 0 | 0 | S | X | X | X | X | X | X | X | X | X | X | X | X | X | X | X | X | X | X | X | X | X | X | X | X | X | X | X | P | X | X | X |
| 0 | 1 | S | X | X | X | X | X | X | X | X | X | X | X | X | X | X | X | X | X | X | X | X | X | X | X | X | X | X | X | P | X | X | X |
| 0 | 2 | S | X | X | X | X | X | X | X | X | X | X | X | X | X | X | X | X | X | X | X | X | X | X | X | X | X | X | X | P | X | X | X |
| 0 | 3 | S | X | X | X | X | X | X | X | X | X | X | X | X | X | X | X | X | X | X | X | X | X | X | X | X | X | X | X | X | X | X | X |
| 0 | 4 | S | X | X | X | X | X | X | X | X | X | X | X | X | X | X | X | X | X | X | X | X | X | X | X | X | X | X | X | X | X | X | X |
| 0 | 5 | S | X | X | X | X | X | X | X | X | X | X | X | X | X | X | X | X | X | X | X | X | X | X | X | X | X | X | X | X | X | X | X |
| 1 | 0 | X | X | X | X | X | X | X | X | X | X | X | X | X | X | X | X | X | X | X | X | X | X | X | X | X | X | X | X | P | X | X | X |
| 1 | 1 | X | X | X | X | X | X | X | X | X | X | X | X | X | X | X | X | X | X | X | X | X | X | X | X | X | X | X | X | P | X | X | X |
| 1 | 2 | X | X | X | X | X | X | X | X | X | X | X | X | X | X | X | X | X | X | X | X | X | X | X | X | X | X | X | X | P | X | X | X |
| 1 | 3 | S | X | X | X | X | X | X | X | X | X | X | X | X | X | X | X | X | X | X | X | X | X | X | X | X | X | X | X | X | X | X | X |
| 1 | 4 | S | X | X | X | X | X | X | X | X | X | X | X | X | X | X | X | X | X | X | X | X | X | X | X | X | X | X | X | X | X | X | X |
| 1 | 5 | S | X | X | X | X | X | X | X | X | X | X | X | X | X | X | X | X | X | X | X | X | X | X | X | X | X | X | X | X | X | X | X |
| 2 | 0 | X | X | X | X | X | X | X | X | X | X | X | X | X | X | X | X | X | X | X | X | X | X | X | X | X | X | X | X | P | X | X | X |
| 2 | 1 | X | X | X | X | X | X | X | X | X | X | X | X | X | X | X | X | X | X | X | X | X | X | X | X | X | X | X | X | P | X | X | X |
| 2 | 2 | X | X | X | X | X | X | X | X | X | X | X | X | X | X | X | X | X | X | X | X | X | X | X | X | X | X | X | X | P | X | X | X |
| 2 | 3 | S | X | X | X | X | X | X | X | X | X | X | X | X | X | X | X | X | X | X | X | X | X | X | X | X | X | X | X | X | X | X | X |
| 2 | 4 | S | X | X | X | X | X | X | X | X | X | X | X | X | X | X | X | X | X | X | X | X | X | X | X | X | X | X | X | X | X | X | X |
| 2 | 5 | S | X | X | X | X | X | X | X | X | X | X | X | X | X | X | X | X | X | X | X | X | X | X | X | X | X | X | X | X | X | X | X |

FIG. 7

Block[m]

| WL | STR0 | STR1 | STR2 | STR3 | STR4 | STR5 |
|----|------|------|------|------|------|------|
| 0 | 0 | 1 | 2 | 3 | 4 | 5 |
| 1 | 6 | 7 | 8 | 9 | 10 | 11 |
| 2 | 12 | 13 | 14 | 15 | 16 | 17 |
| 3 | 18 | 19 | 20 | 21 | 22 | 23 |
| 4 | 24 | 25 | 26 | 27 | 28 | 29 |

Block[n]

| WL | STR0 | STR1 | STR2 | STR3 | STR4 | STR5 |
|----|------|------|------|------|------|------|
| 0 | 0 | 1 | 2 | 3 | 4 | 5 |
| 1 | 6 | 7 | 8 | 9 | 10 | 11 |
| 2 | 12 | 13 | 14 | 15 | 16 | 17 |
| 3 | 18 | 19 | 20 | 21 | 22 | 23 |
| 4 | 24 | 25 | 26 | 27 | 28 | 29 |

VirtualBlock[M]

| WL | VS0 | VS1 | VS2 | VS3 | VS4 | VS5 | VS6 | VS7 | VS8 | VS9 | VS10 | VS11 |
|----|-----|-----|-----|-----|-----|-----|-----|-----|-----|-----|------|------|
| 0 | 0 | 1 | 2 | 3 | 4 | 5 | 6 | 7 | 8 | 9 | 10 | 11 |
| 1 | 12 | 13 | 14 | 15 | 16 | 17 | 18 | 19 | 20 | 21 | 22 | 23 |
| 2 | 24 | 25 | 26 | 27 | 28 | 29 | 30 | 31 | 32 | 33 | 34 | 35 |
| 3 | 36 | 37 | 38 | 39 | 40 | 41 | 42 | 43 | 44 | 45 | 46 | 47 |
| 4 | 48 | 49 | 50 | 51 | 52 | 53 | 54 | 55 | 56 | 57 | 58 | 59 |

FIG. 10

MEMORY SYSTEMS AND OPERATION METHODS THEREOF AND STORAGE DEVICES AND OPERATION METHODS THEREOF

CROSS-REFERENCE TO RELATED APPLICATION

The present disclosure claims the benefit of priority to China Application No. 202410324106.0, filed on Mar. 20, 2024, the content of which is incorporated herein by reference in its entirety.

TECHNICAL FIELD

Examples of the present disclosure relate to semiconductor technology, and particularly to, but not limited to, memory systems and operation methods thereof and storage devices and operation methods thereof.

BACKGROUND

With the rapid development of information technology, memory technology is also witnessing continuous breakthroughs and innovations. A memory is a vital part of a computer system and is responsible for storage and reading of data, which directly affects the performance and user experience of a computer.

BRIEF DESCRIPTION OF THE DRAWINGS

In the drawings, like reference numerals may describe like components in different views. Like reference numerals having different letter suffixes may represent different examples of like components. The accompanying drawings illustrate, by way of example, but not by way of limitation, various examples as discussed herein.

FIG. 2 is a schematic diagram of a strip in Die RAIN error correction technique;

FIG. 3 is a schematic diagram of a strip in PLANE RAIN error correction technique;

FIG. 4 is a schematic diagram of a strip in 2-WL RAIN error correction technique;

FIG. 5 is a schematic diagram of a strip in Half-WL RAIN error correction technique;

FIG. 6 and FIG. 7 show a case in which word line leakage occurs in both adjacent word lines (WL0 and WL1) in a same memory block;

FIG. 10 is a schematic diagram of a strip provided by an example of the present disclosure;

DETAILED DESCRIPTION

Figure 1A:
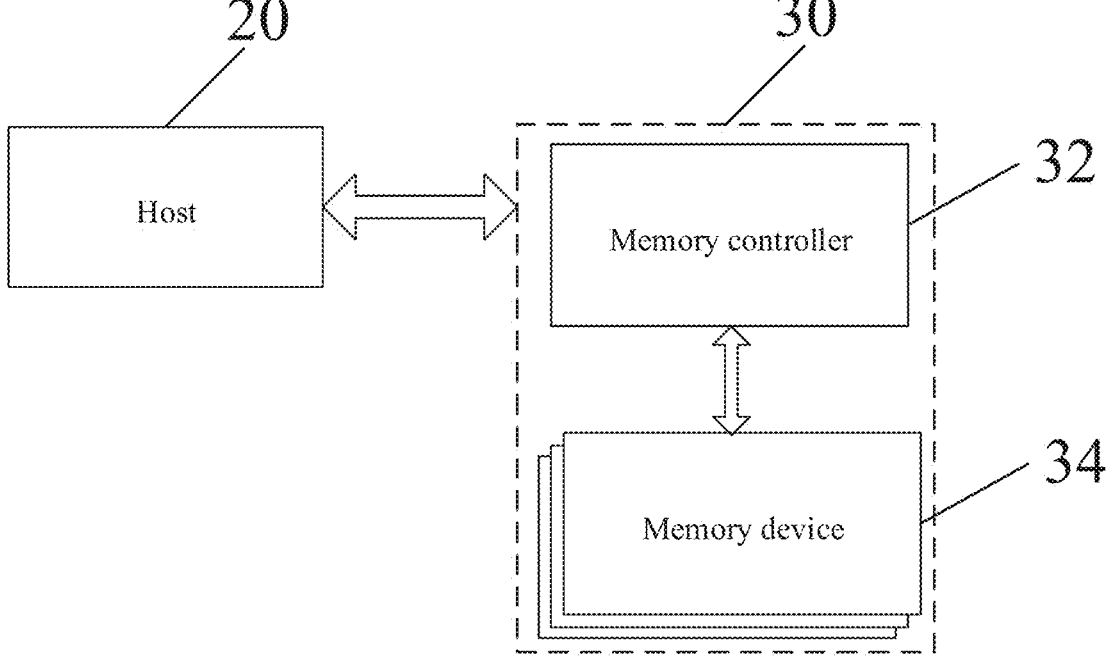
FIG. 1A is a schematic structural diagram of a memory system provided by examples of the present disclosure.

In order to facilitate the understanding of the present disclosure, the present disclosure will be described below more comprehensively with reference to the relevant drawings. Examples of the present disclosure are given in the drawings. However, the present disclosure may be implemented in many different forms, and is not limited to the examples described herein. Instead, the purpose of providing these examples is to make the disclosure of the present disclosure more thorough and comprehensive.

Unless otherwise defined, all technical and scientific terms used herein have the same meanings as those understood by a person skilled in the art. The terms used in the specification of the present disclosure are only for the purpose of describing examples, and are not intended to limit the present disclosure. The term "at least one of" used herein comprise any and all combinations of one or more listed associated items.

As shown in FIG. 1A, examples of the present disclosure show an example system 10. The example system 10 may comprise a host 20 and a memory system 30. The example system 10 may comprise, but is not limited to, a mobile phone, a desktop computer, a laptop computer, a tablet computer, a vehicle computer, a gaming console, a printer, a positioning device, a wearable electronic device, a smart sensor, a Virtual Reality (VR) device, an Augmented Reality (AR) device, or any other suitable electronic device having memories 34 therein. The host 20 may be a processor (e.g., a Central Processing Unit (CPU) or a System on Chip (SoC) (e.g., an Application Processor (AP)) of an electronic device.

In an example of the present disclosure, the host 20 may be configured to send or receive data to or from the memory system 30. Here, the memory system 30 may comprise a memory controller 32 and one or more memory devices 34. The memory devices 34 may include, but are not limited to, a NAND Flash Memory, a vertical NAND Flash Memory, a NOR Flash Memory, a Dynamic Random Access Memory (DRAM), a Ferroelectric Random Access Memory (FRAM), a Magnetoresistive Random Access Memory (MRAM), a Phase Change Random Access Memory (PCRAM), a Resistive Random Access Memory (RRAM), and a Nano Random Access Memory (NRAM), etc.

In an example of the present disclosure, the memory controller 32 may be coupled to the memory devices 34 and the host 20, and is configured to control the memory devices 34. In an example, the memory controller 32 may be designed for operating in low duty-cycle environments such as a Secure Digital (SD) card, a Compact Flash (CF) card, a Universal Serial Bus (USB) flash drive, or other media for use in electronic devices, such as a personal computer, a digital camera, and a mobile phone, etc. In some examples, the memory controller 32 may be also designed for operating in a high duty-cycle environment such as SSDs or embedded Multi-Media Cards (eMMCs) used as data storage for mobile devices, such as smartphones, tablet computers, laptop computers, etc., and enterprise memory arrays.

Further, the memory controller 32 can manage data in the memory devices 34 and communicate with the host. The memory controller 32 may be configured to control read, erase and program operations of the memory device 34, may be further configured to manage various functions with respect to data stored or to be stored in the memory device 34, comprising, but not limited to, bad-block management, garbage collection, logical-to-physical address conversion, wear leveling, etc., and may be further configured to process Error Correction Code (ECC) with respect to data read from the memory device 34 or written to the memory device 34. Furthermore, the memory controller 32 may further perform any other suitable functions as well, e.g., formatting the memory device 34 or communicating with an external device (e.g., the host 20 in FIG. 1A) according to a particular communication protocol. In an example, the memory controller 32 may communicate with an external host through at least one of various interface protocols, such as a USB protocol, an MMC protocol, a Peripheral Component Interconnect (PCI) protocol, a Peripheral Component Interconnect Express (PCI-E) protocol, an Advanced Technology Attachment (ATA) protocol, a serial ATA protocol, a parallel ATA protocol, a Small Computer System Interface (SCSI) protocol, an Enhanced Small Drive Interface (ESDI) protocol, an Integrated Development Equipment (IDE) protocol, a Firewire protocol, etc.

Figure 1B:
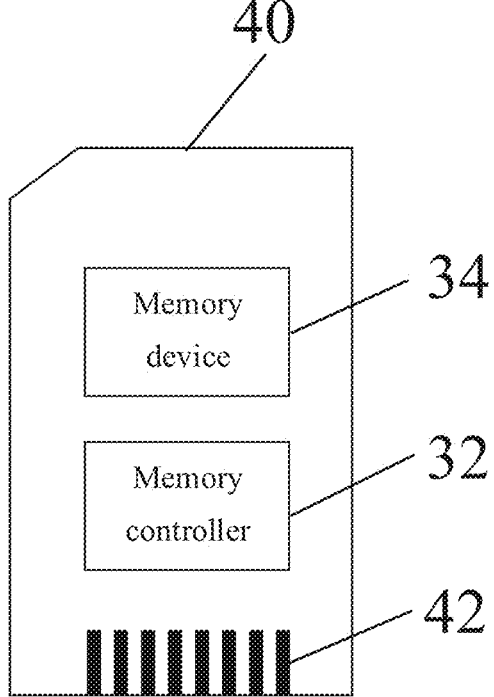
FIG. 1B is a schematic structural diagram of a memory card provided by examples of the present disclosure.
Figure 1C:
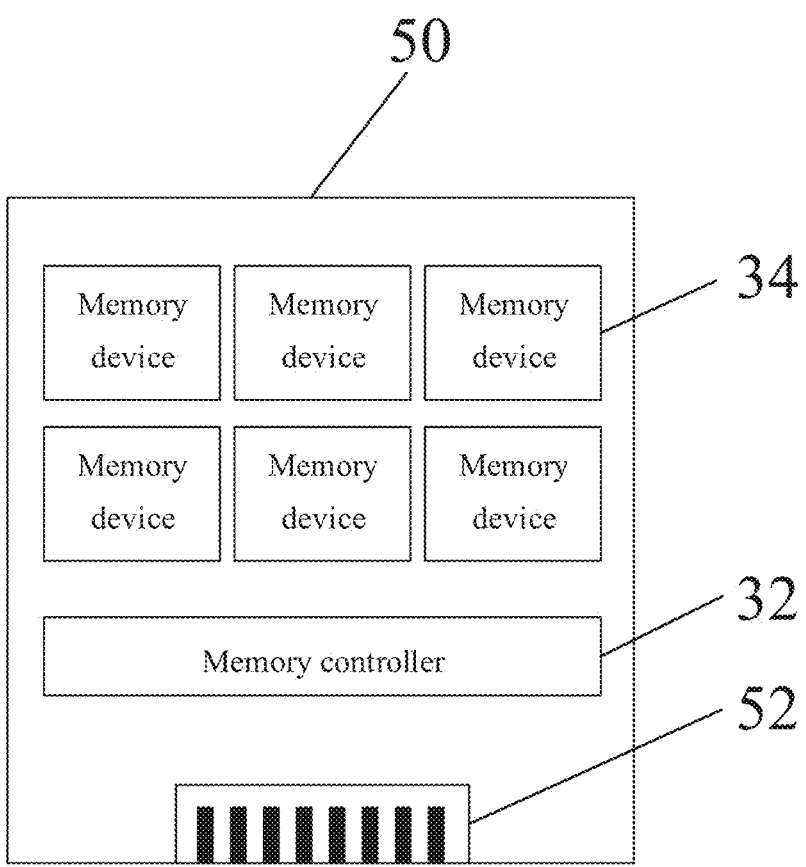
FIG. 1C is a schematic structural diagram of a Solid State Disk (SSD) provided by examples of the present disclosure.

In an example of the present disclosure, the memory controller 32 and the one or more memory devices 34 may be integrated into various types of memory devices, for example, be comprised in the same package, such as a Universal Flash Storage (UFS) package or an eMMC package. That is to say, the memory system 30 may be implemented and packaged into different types of end electronic products. As shown in FIG. 1B, the memory controller 32 and a single memory device 34 may be integrated together to form a memory card 40. The memory card 40 may comprise a Personal Computer Memory Card International Association (PC) card, a CF card, a Smart Media (SM) card, a memory stick, a Multi-Media Card (MMC, Reduced-Size MMC (RS-MMC), and MMCmicro), an SD card (SD, miniSD, microSD, Secure Digital High Capacity (SDHC)), and a UFS, etc. The memory card 40 may further comprise a memory card connector 42 coupling the memory card 40 with a host (e.g., the host 20 in FIG. 1A). In another example as shown in FIG. 1C, the memory controller 32 and a plurality of memory devices 34 may be integrated together to form an SSD 50. The SSD 50 may further comprise an SSD connector 52 coupling the SSD 50 with a host (e.g., the host 20 in FIG. 1A). In some examples, at least one of a storage capacity or an operation speed of the SSD 50 is greater than at least one of a storage capacity or an operation speed of the memory card 40.

Figure 1D:
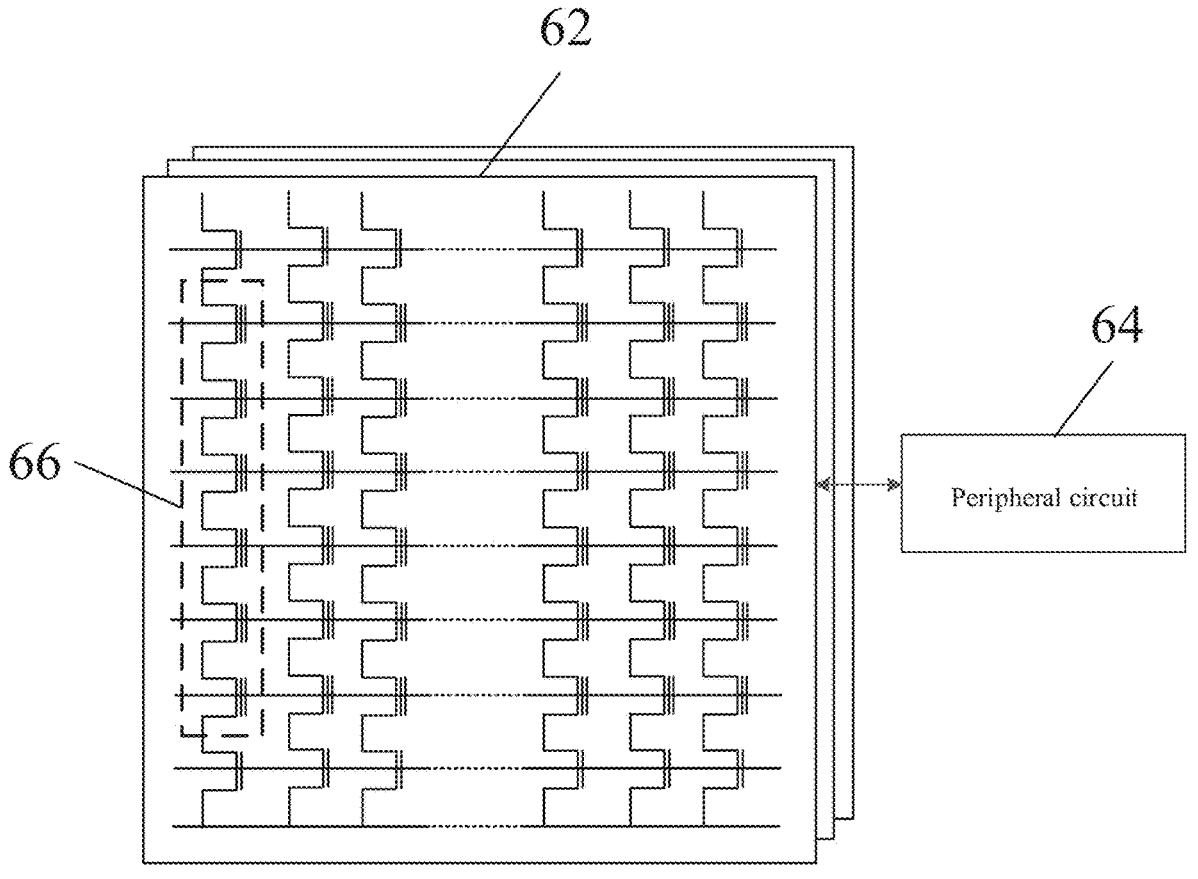
FIGS. 1D and 1E are schematic structural diagrams of a memory device comprising a memory array and a peripheral circuit provided by examples of the present disclosure.

It is to be noted that the memory involved in an example of the present disclosure may be a semiconductor memory, which is a solid-state electronic device fabricated by a semiconductor integrated circuit process for storing data information. In an example, FIG. 1D is a schematic diagram of a memory device 34 in the examples of the present disclosure. As shown in FIG. 1D, the memory device 34 may comprise a memory array 62 and a peripheral circuit 64 coupled to the memory array 62, etc. Here, the memory array may be a NAND flash memory array in which memory cells are disposed in a form of an array of NAND memory strings 66 each extending vertically above a substrate. In some examples, each NAND memory string 66 may comprise a plurality of memory cells that are coupled in series and stacked vertically. Each memory cell may hold a continuous analog value, such as a voltage or charge, which depends on the number of electrons trapped within a region of the memory cell. In addition, the memory cell in the above-mentioned memory array 62 may be either a floating gate type memory cell that comprises a floating gate transistor, or a charge trapping type memory cell that comprises a charge trapping transistor.

In an example of the present disclosure, the above-mentioned memory cell may be a Single Level Cell (SLC) that has two possible memory states, and thus can store one bit of data. For example, the first memory state "0" may correspond to a first threshold voltage range, and the second memory state "1" may correspond to a second threshold voltage range. In some other examples, each memory cell may be a Multi Level Cell (MLC) that is capable of storing more than a single bit of data. For example, the MLC may store two bits per cell. Each memory cell may be a Triple Level Cell (TLC), or each memory cell may be a Quad Level Cell (QLC). Each MLC may be programmed to assume a range of possible nominal storage values. In an example, if each MLC stores two bits of data, the MLC may be programmed to write one of three possible nominal storage values to the memory cell, such that the memory cell is programmed from an erased state to one of three possible programming states. A fourth nominal storage value may be used for the corresponding erased state.

Figure 1E:
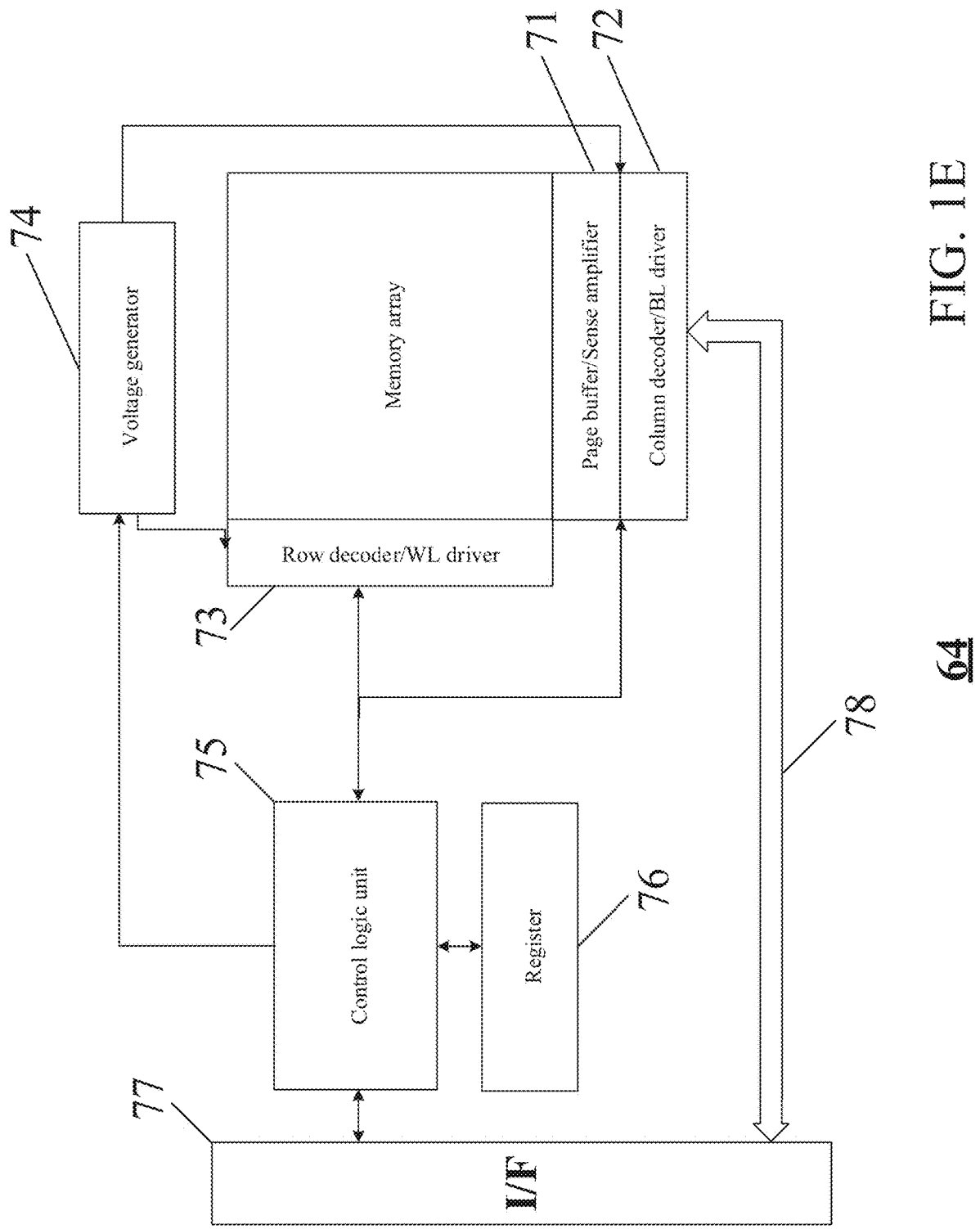

In the examples of the present disclosure, the above-mentioned peripheral circuit 64 may be coupled to the memory array through a Bit Line (BL), a Word Line (WL), a Source Line, a Source Select Gate (SSG) and a Drain Select Gate (DSG). Here, the peripheral circuit 64 may comprise any suitable analog, digital, and mixed signal circuits for facilitating relevant operations of the memory array by applying and sensing at least one of voltage signals or current signals to and from each target memory cell via the bit line, the word line, the source line, the SSG, or the DSG, etc. Furthermore, the peripheral circuit 64 may further comprise various types of peripheral circuits formed using Metal-Oxide-Semiconductor (MOS) technology. In an example, as shown in FIG. 1E, the peripheral circuit 64 may comprise a Page Buffer (PB)/sense amplifier 71, a column decoder/bit line driver 72, a row decoder/word line driver 73, a voltage generator 74, a control logic unit 75, a register 76, an interface 77, and a data bus 78. In some other examples, the peripheral circuit 64 may further comprise additional peripheral circuits not shown in FIG. 1E.

Figure 1F:
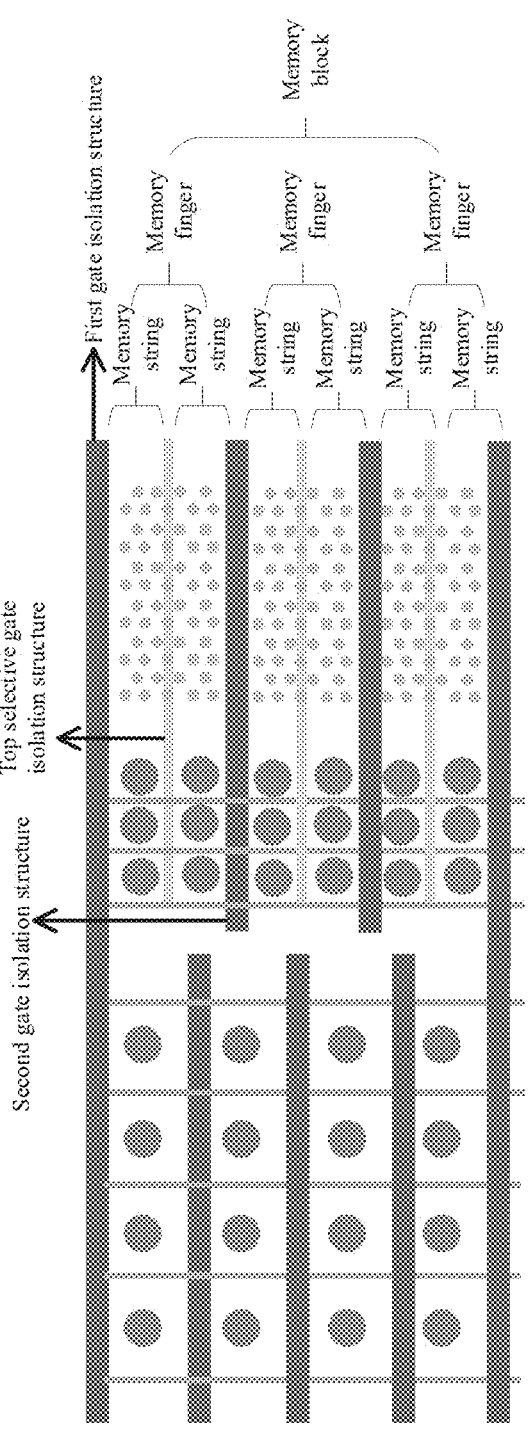
FIG. 1F is a schematic distribution diagram of memory cells of a three-dimensional NAND type memory according to an example of the present disclosure.

FIG. 1F shows an example of a schematic structural diagram of a memory array of a three-dimensional NAND type memory. As shown in FIG. 1F, the memory array of the three-dimensional NAND type memory is formed by a plurality of memory cell rows that are staggered in parallel and are parallel to a gate isolation structure. Every four memory cell rows are spaced apart by the gate isolation structure and a top selective gate isolation structure. Each memory cell row comprises a plurality of memory cells. The gate isolation structure may comprise a first gate isolation structure and a second gate isolation structure. The first gate isolation structure divides the memory array into a plurality of memory blocks. A plurality of second gate isolation structures may divide the memory blocks into a plurality of memory fingers. The top selective gate isolation structure disposed in the middle of each memory finger may divide the memory finger into two portions, so as to divide the memory finger into two memory strings. One memory block shown in FIG. 1F comprises 6 memory strings. During actual application, the number of memory strings in one memory block is not limited thereto. A memory cell in one memory string coupled with a word line may be referred to as one memory page. The memory page here is a physical page.

An example in which a memory system is an SSD is used for description in examples of the present disclosure. It is to be understood that the present disclosure is not limited thereto.

Redundant array of independent NAND (RAIN) error correction technique is used in an SSD to protect data on a solid-state disk. A RAIN check code needs to occupy a part of an over-provisioning (OP) capacity on a solid-state disk, and moreover a swap buffer area with a certain size is also required in an SRAM to store the RAIN check code.

In some examples, Die RAIN error correction technique or Plane RAIN error correction technique may be used for the SSD to correct data.

The Die RAIN error correction technique and the Plane RAIN error correction technique are respectively described below.

FIG. 2 shows an example of the Die RAIN error correction technique used in the SSD. Here, CE0 and CE1 are chip enable (CE) signals, and CH0 to CH3 are channels (CH). A channel is a group of physical pins, and is configured to receive and transmit data and commands.

When CE0 is valid, four dies are enabled, and when CE1 is valid, the other four dies are enabled. Which die is enabled to work in some examples depends on a channel from which a command comes. The channels and the dies are connected in a one-to-one correspondence. That is, one die may be enabled through CE and a CH. One die here may be understood as one memory device. The small box under the String of WL0 in FIG. 2 may represent one physical page. For example, one small box in which S is located is one physical page, and one small box in which X is located is one physical page, and one small box in which P is located is one physical page.

With continued reference to FIG. 2, P0 to P3 represent memory planes. A memory plane is an independent memory unit in a die and is configured to store and manage data. Each memory plane may independently perform read, write, and erase operations. By performing a plurality of operations simultaneously, the performance of the SSD can be improved through a die having a plurality of memory planes. S represents a start data page of a strip, X represents an intermediate data page of the strip, and P represents a check page of the strip. In the Die RAIN error correction technique, a plurality of physical pages in memory planes (for example, P0 in a die 0 and P0 in a die 1) with the same sequence number in different dies form one strip. Each die here corresponds to four memory planes (P0 to P3). Therefore, four strips are opened when data is written each time.

When the Die RAIN error correction technique is used, if a memory cell is a TLC and has three logical pages, namely, an LP, an MP, and an UP, the three logical pages are respectively placed on different strips. When data is written each time, the data needs to be simultaneously written on four memory planes. Therefore, each of the LP, the MP, and the UP corresponds to four strips, and data is also simultaneously written on the LP, the MP, and the UP. Therefore, twelve strips are opened. Before being written to corresponding twelve strips, check bits generated by the twelve strips need to be temporarily stored in a buffer (SWAP RAM) and occupy a space with a size of twelve physical pages (a check bit of each strip occupies a space with a size of one physical page) in the buffer.

In the example, a ratio of an over-provisioned space occupied by the check bits to a total memory space is $\frac{1}{8}*100\%=12.5\%$.

FIG. 3 shows an example of using the Plane RAIN error correction technique on an SSD. In the Plane RAIN error correction technique, a plurality of physical pages in all memory planes in different dies form one strip. A dashed-line box in FIG. 3 shows one strip. Therefore, one strip may be opened when data is written each time.

When the Plane RAIN error correction technique is used, if a memory cell is a TLC, 3*1=3 strips are generated. Before being written to corresponding three strips, check bits generated by the three strips need to be temporarily stored in a buffer and occupy a space with a size of three physical pages (a check bit of each strip occupies a space with a size of one physical page) in the buffer.

In the example, a ratio of an over-provisioned space occupied by the check bits to a total memory space is $1/(4*8)*100\%=3.1\%$.

A common problem of the Die RAIN and Plane RAIN error correction techniques is that the ratio of the over-provisioned space occupied by the check bits to the total memory space is excessively large. As a result, a ratio of a memory space occupied by valid data bits to the total memory space decreases. That is, the utilization of the total memory space decreases. To improve the utilization of the total memory space is the goal of an SSD.

Figure 4:
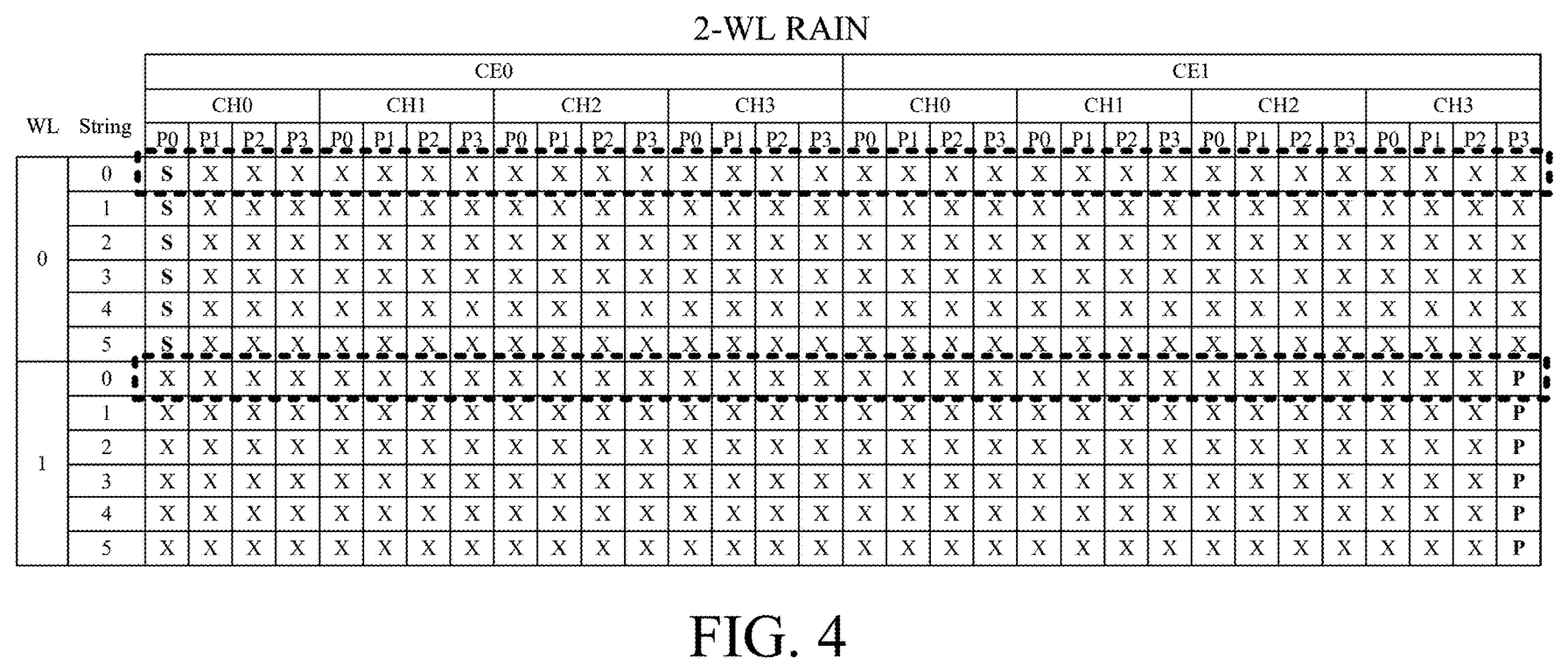

FIG. 4 shows an example of 2-WL RAIN error correction technique. In the example, one strip corresponds to a plurality of physical pages coupled with two word lines. In some examples, in a plurality of physical pages coupled with WL0 and WL1, physical pages under strings with the same sequence number form one strip. In an example, two dashed-line boxes in FIG. 4 form one strip. A write sequence of data is as follows: data is written to String0 of WL0 first, then sequentially written to String1 of WL0, String2 of WL0, . . . , and finally written to String5 of WL0. However, each strip in this example needs to occupy a plurality of physical pages coupled with two WLs. Therefore, after the write to WL0 is completed, none of the six strips is closed, and when data is written to String0 of WL1 and check bits corresponding to the strip are written, the write to strips corresponding to WL0-String0 and WL1-String0 is completed.

When the above-mentioned 2-WL RAIN error correction technique is used, if a memory cell is a TLC, 3*6=18 strips are generated. Before being written to corresponding eighteen strips, check bits generated by the eighteen strips need to be temporarily stored in a buffer and occupy a space with a size of eighteen physical pages (a check bit of each strip occupies a space with a size of one physical page) in the buffer.

In the example, a ratio of an over-provisioned space occupied by the check bits to a total memory space is $1/(2*4*8)*100\%=1.6\%$.

Figure 5:
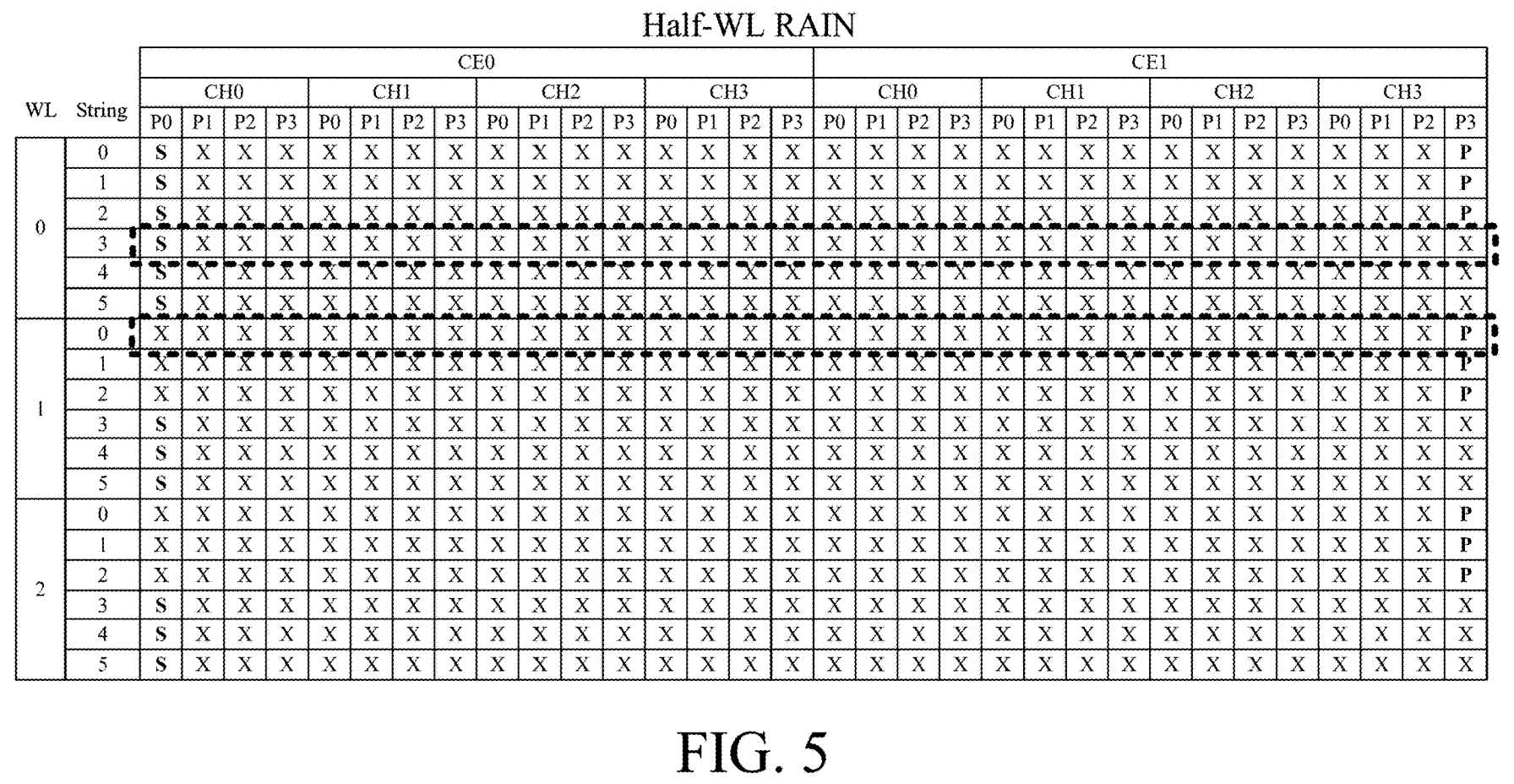

FIG. 5 shows an example of Half-WL RAIN error correction technique. In the example, String3 of a former WL and String0 of a latter WL form one strip. Two dashed-line boxes in FIG. 5 form one strip. String4 of a former WL and String1 of a latter WL form one strip. String5 of a former WL and String2 of a latter WL form one strip. In this way, when data is written to a former WL, there are three Open (unfinished) strips. The three strips are Closed (finished)

only when data is written to a next WL and check bits corresponding to these strips are written.

When the above-mentioned Half-WL RAIN error correction technique is used, if a memory cell is a TLC, 3*3=9 strips are generated. Before being written to corresponding nine strips, check bits generated by the nine strips need to be temporarily stored in a buffer and occupy a space with a size of nine physical pages (a check bit of each strip occupies a space with a size of one physical page) in the buffer.

In the example, a ratio of an over-provisioned space occupied by the check bits to a total memory space may be 1/(2*4*8)*100%=1.6%.

Compared with the Die RAIN error correction technique and the PLANE RAIN error correction technique, it can be seen that when the 2-WL RAIN and Half-WL RAIN error correction techniques are used, the ratio of the over-provisioned space occupied by the check bits to the total memory space can be reduced, and the ratio of the memory space occupied by valid data bits to the total memory space can be improved, thereby improving the utilization of the total memory space. However, in the 2-WL RAIN and Half-WL RAIN error correction techniques, physical pages that belong to a same strip are inevitably coupled with two adjacent word lines in a same memory block.

In some examples, a NAND product faces problems such as word line leakage, and in the worst case, data on a word line with a leakage problem is completely lost. FIG. 6 and FIG. 7 show a case in which word line leakage occurs on adjacent word lines (WL0 and WL1) in same memory block. In this case, data of two physical pages on one strip is lost. When data of two (and more) physical pages on one strip is lost, the lost data cannot be corrected, that is, cannot be recovered.

To resolve the above-mentioned problem, examples of the present disclosure provide a memory system, comprising at least one memory device and a memory controller coupled with the at least one memory device, wherein each memory device comprises a plurality of memory planes, each of the memory planes comprises K memory blocks, each of the memory blocks comprises N word lines, each of the word lines is coupled with M physical pages, the $k^{th}$ memory blocks in respective memory planes in the at least one memory device form one super memory block, a plurality of super memory blocks form one virtual memory block, the $m^{th}$ physical pages coupled with the $n^{th}$ word lines in each of the memory planes from a same super memory block in each virtual memory block form one virtual physical page, the virtual physical pages from different super memory blocks in a same virtual memory block form one strip, and M, N, and K are positive integers, $1 \le n \le N$, $1 \le m \le M$, and $1 \le k \le K$; and the memory controller is configured to:

receive memory data to be written that needs to be written to a strip to be written;

generate parity check data of the strip to be written according to the memory data to be written; and send the memory data to be written and the parity check data to the memory device.

Figure 8:
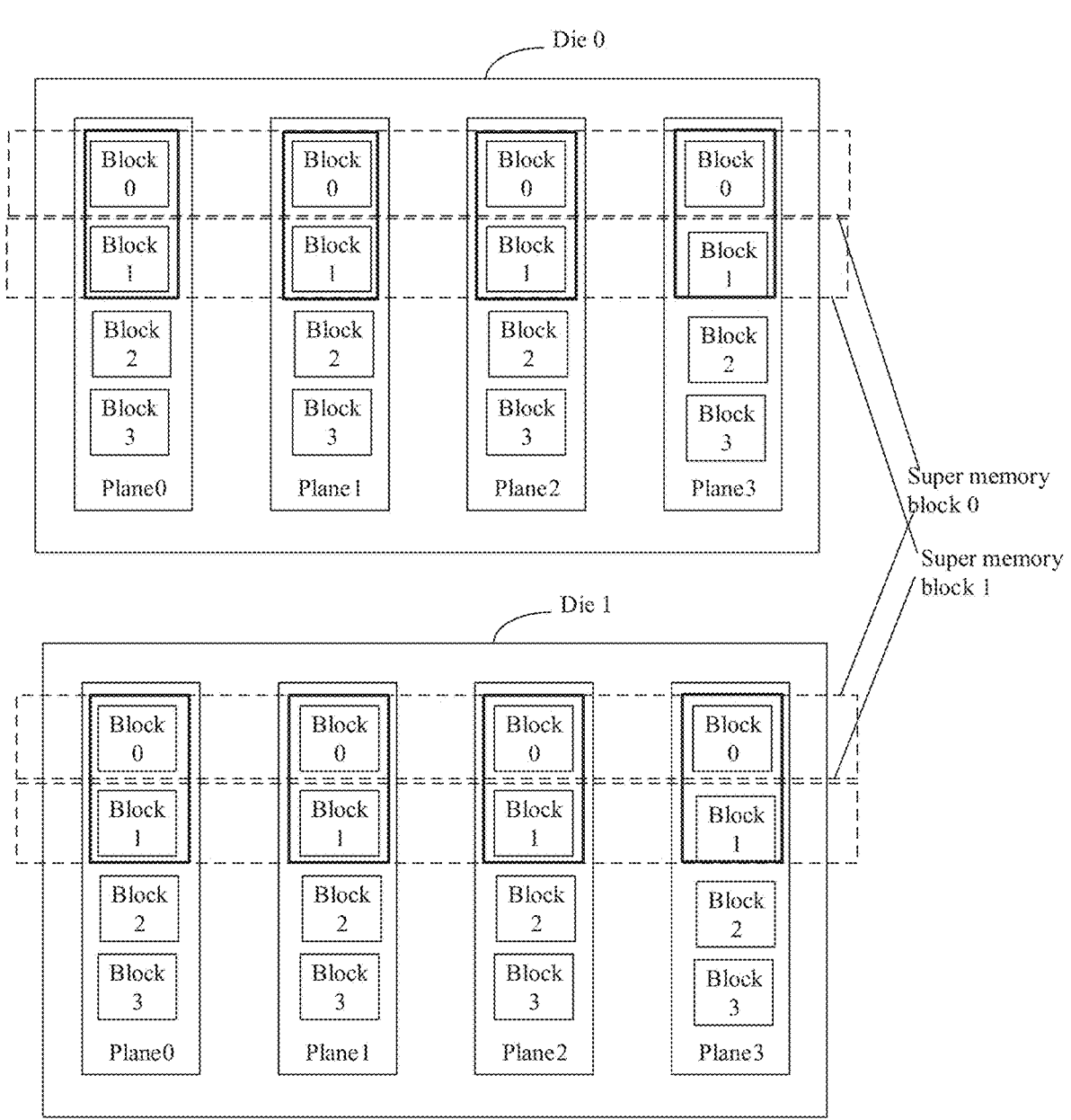
FIG. 8 is a schematic diagram of a storage device.

In the examples of the present disclosure, different dies comprise a same number of memory planes, and the memory planes may be sequentially numbered starting from 0 (for example, Plane0, Plane1, Plane2, . . . ). Different memory planes comprise a same number of memory blocks, and memory blocks may be sequentially numbered starting from 0 (for example, Block0, Block1, Block2, . . . ). FIG. 8 shows an example in which one storage device comprises two dies, each die comprises four memory planes, and each memory plane comprises four memory blocks. It should be understood that the above-mentioned number of the dies, number of the memory planes, and number of the memory blocks are only examples. This is not limited in the present disclosure.

Therefore, the storage device shown in FIG. 8 comprises four super memory blocks. Block0 in different memory planes in different dies form a super memory block 0, Block1 in different memory planes in different dies form a super memory block 1, Block2 in different memory planes in different dies form a super memory block 2, and Block3 in different memory planes in different dies form a super memory block 3.

In the examples of the present disclosure, a plurality of super memory blocks (for example, two, three, four, or the like) may form one virtual memory block. An example in which two super memory blocks form one virtual memory block is used for description below. It is to be understood that the present disclosure is not limited thereto.

In the examples of the present disclosure, a super memory block whose sequence number is m (denoted as SB[m]) and a super memory block whose sequence number is n (denoted as SB[n]) are combined into one virtual memory block. In some examples, memory blocks that belong to a same Die-Plane in two super memory blocks are combined into one virtual sub-memory block. Memory blocks that belong to a same Die-Plane in the two super memory blocks are all combined two by two to form a plurality of virtual sub-memory blocks. The plurality of virtual sub-memory blocks formed from the two super memory blocks form one virtual memory block. For example, Block0 in Plane0 in a die 0 and Block1 in Plane0 in the die 0 both belong to Die0-Plane0. Block0 in Plane1 in the die 0 and Block1 in Plane1 in the die 0 both belong to Die0-Plane1, and the like.

In some examples, each super memory block comprises eight memory blocks, and a virtual memory block obtained by combining two super memory blocks also comprises eight virtual sub-memory blocks (that is, two memory blocks from a same Die-Plane in two different super memory blocks are combined to form one virtual sub-memory block). The number of memory blocks comprised in each super memory block is not limited in the present disclosure.

Figure 9:
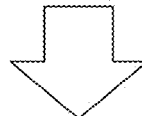
FIG. 9 is a schematic diagram of mapping two super memory blocks to a virtual memory block.

FIG. 9 is a schematic diagram of mapping a memory block 0 of Die0-Plane0 in SB[m] and a memory block 1 of Die0-Plane0 in SB[n] together to a virtual memory block M (denoted as VB[M]). It is to be noted that, FIG. 9 only shows an example of a combination of memory blocks of Die0-Plane0, and the virtual memory block M further comprises two-to-two combinations of memory blocks of other same Die-Plane in SB[m] and SB[n].

Each memory block comprises a plurality of word lines (for example, WL0 to WL4). Each word line is coupled with a plurality of physical pages, that is, each WL-STR corresponds to one physical page. For example, WL0-STR0 corresponds a physical page whose sequence number is 0.

Physical pages in each memory block are numbered starting from 0, and a sequence number of the $(i+1)^{th}$ physical page is denoted as a physical page [i].

A physical page [i] corresponding to a memory block 0 of Die0-Plane0 in SB[m] is mapped to a virtual sub-physical page [2i] in a virtual sub-memory block. For example, a physical page [0] is mapped to a virtual sub-physical page [0] in a virtual sub-memory block, and a physical page [1] is mapped to a virtual sub-physical page [2] in a virtual sub-memory block, and the like.

A physical page [i] in a memory block 1 of Die0-Plane0 in SB[n] is mapped to a virtual sub-physical page [2i+1] in a virtual sub-memory block. For example, a physical page [0] in each memory block 1 is mapped to a virtual sub-physical page [1] in a virtual sub-memory block, and a physical page [1] in each memory block 1 is mapped to a virtual sub-physical page [3] in a virtual sub-memory block, and the like.

Figure 10:
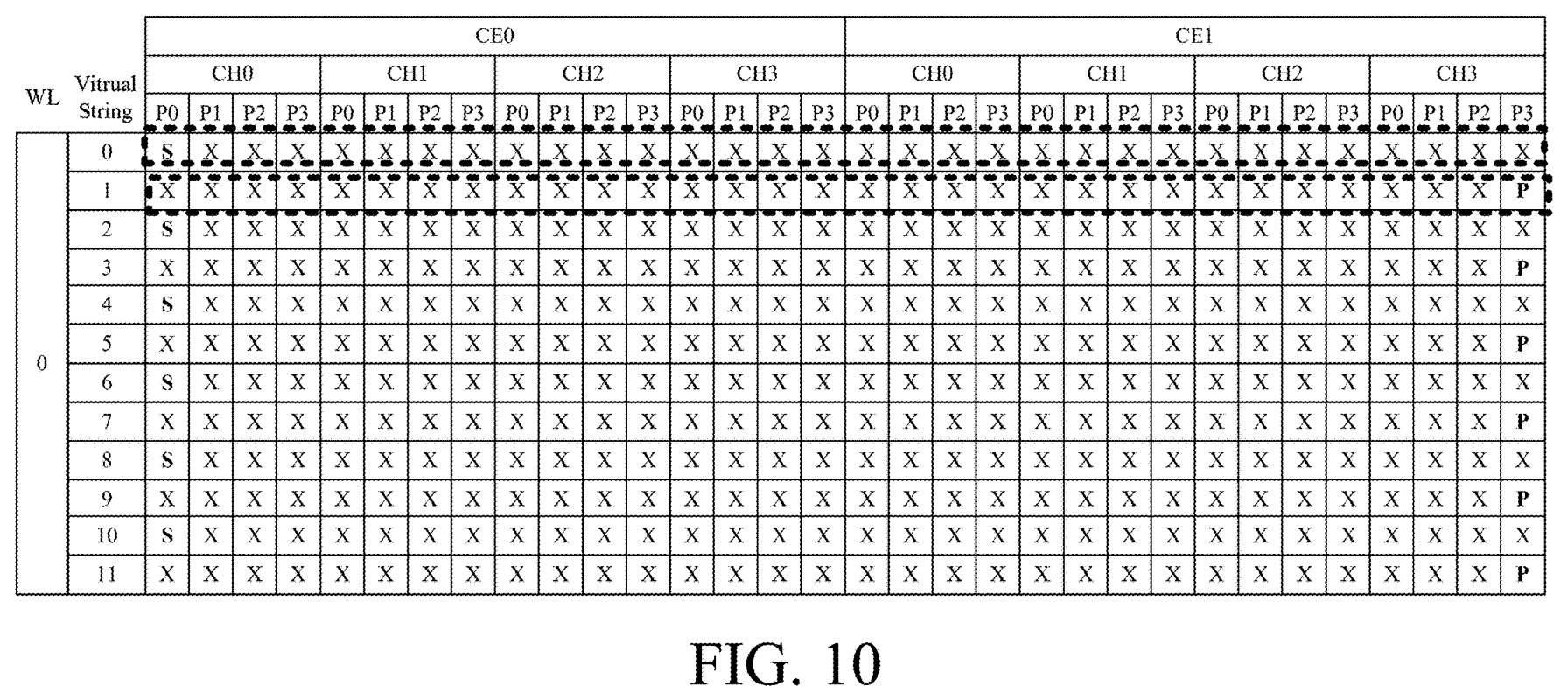

The $m^{th}$ physical pages coupled with the $n^{th}$ word lines in each of the memory plane from a same super memory block in each of the virtual memory blocks form one virtual physical page. The $m^{th}$ physical pages coupled with the $n^{th}$ word lines in Block0 and Block1 on one Die-Plane (for example, Die0-Plane0) form one virtual sub-physical page. The $m^{th}$ physical pages coupled with the $n^{th}$ word lines in a plurality of Block0 and Block1 on each Die-Plane from a same super memory block form one virtual physical page. A row indicated by one dashed-line box shown in FIG. 10 is one virtual physical page, and each small box of a plurality of small boxes indicated by one dashed-line box is one virtual sub-physical page. One virtual sub-physical page here is also one physical page.

In the examples of the present disclosure, virtual physical pages from different super memory blocks in a same virtual memory block form one strip. WL0-VS0 and WL0-VS1 in FIG. 9 correspond to one strip together, that is, a plurality of physical pages corresponding to WL0-Virtual string0 and WL0-Virtual string1 in FIG. 10. In some examples, as shown in FIG. 10, each dashed-line box indicates one virtual physical page, and two virtual physical pages indicated by two dashed-line boxes are from different super memory blocks and form one strip.

Figure 11:
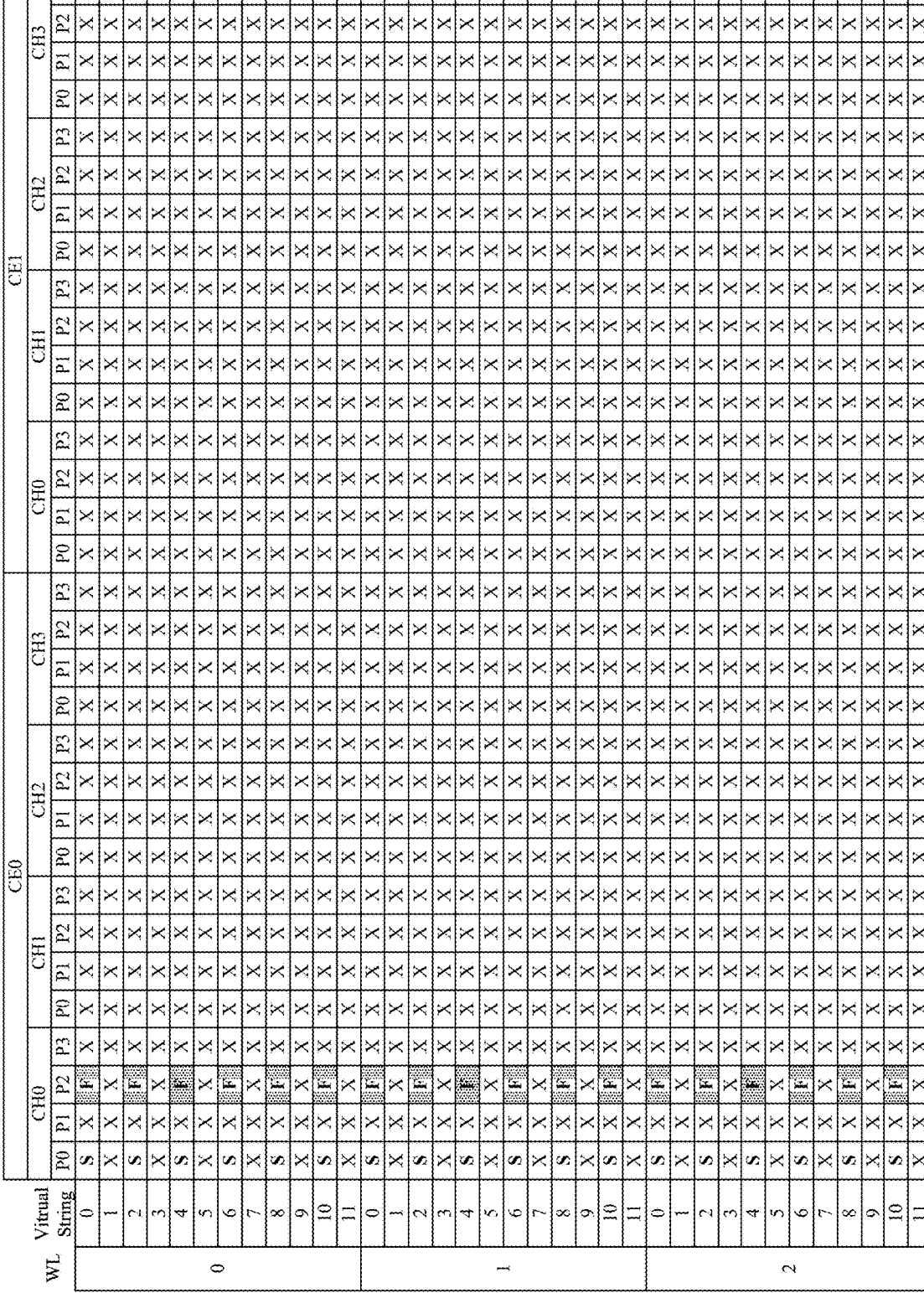
FIG. 11 shows a case in which leakage occurs in a plurality of word lines in a memory block.

FIG. 11 shows a case in which leakage occurs on a plurality of word lines. Because a plurality of physical pages corresponding to WL0-Virtual string0 are from memory blocks 0 of each of the memory planes of each of the memory devices, and a plurality of physical pages corresponding to WL0-Virtual string1 are from memory blocks 1 of each of the memory planes of each of the memory devices, word line leakage that occurs on a memory block to which WL0-Virtual string0 belongs does not affect data on a memory block to which WL0-Virtual string1 belongs. That is, for a strip formed by WL0-Virtual string0 and WL0-Virtual string1, even if leakage occurs on a plurality of word lines in one memory block, memory data in at most one physical page in one strip is affected. The incorrect data can be accurately corrected by using parity check bit data.

A plurality of physical pages comprised in a strip provided in examples of the present disclosure are from different memory blocks, by writing memory data to be written and parity check data into the strip provided in the present disclosure, it is possible to avoid the situation that data not being able to be corrected due to the leakage occurs in a plurality of word lines in the same memory block.

In the RAIN error correction techniques provided in the examples of the present disclosure, if a memory cell is a TLC, 3*1=3 strips are generated. Before being written to corresponding three strips, check bits generated by the three strips need to be temporarily stored in a buffer and occupy a space with a size of three physical pages (a check bit of each strip occupies a space with a size of one physical page) in the buffer.

In the example, a ratio of an over-provisioned space occupied by the check bits to a total memory space is $1/(2*4*8)*100\%=1.6\%$.

Therefore, through the use of the RAIN error correction techniques provided in the examples of the present disclosure, low OP usage and low buffer usage can be implemented, so that more valid data can be stored, and a buffer with a smaller size can be used.

In some examples, the $k^{th}$ memory blocks in respective memory planes in the at least one memory device form one super memory block, a plurality of super memory blocks form one virtual memory block, the $m^{th}$ physical pages coupled with the $n^{th}$ word lines in each of the memory planes from a same super memory block in each virtual memory block form one virtual physical page, and the virtual physical pages from different super memory blocks in a same virtual memory block form one strip.

In this way, memory data to be written and parity check data generated from the memory data to be written are written in such a strip, so that a case in which leakage occurs on a plurality of word lines in a memory block and as a result memory data stored in the strip cannot be accurately corrected can be avoided, OP usage can be reduced, and buffer usage can be reduced. While storage capacity is kept unchanged, the memory device can store more valid memory data, for example, data written by a user.

In some examples, the memory controller is configured to:

receive memory data to be written that needs to be written to a strip to be written;

generate parity check data of the strip to be written according to the memory data to be written; and send the memory data to be written and the parity check data to the memory device.

In the examples of the present disclosure, the memory controller may receive memory data to be written that is from a host and needs to be written to a strip to be written.

Figure 12:
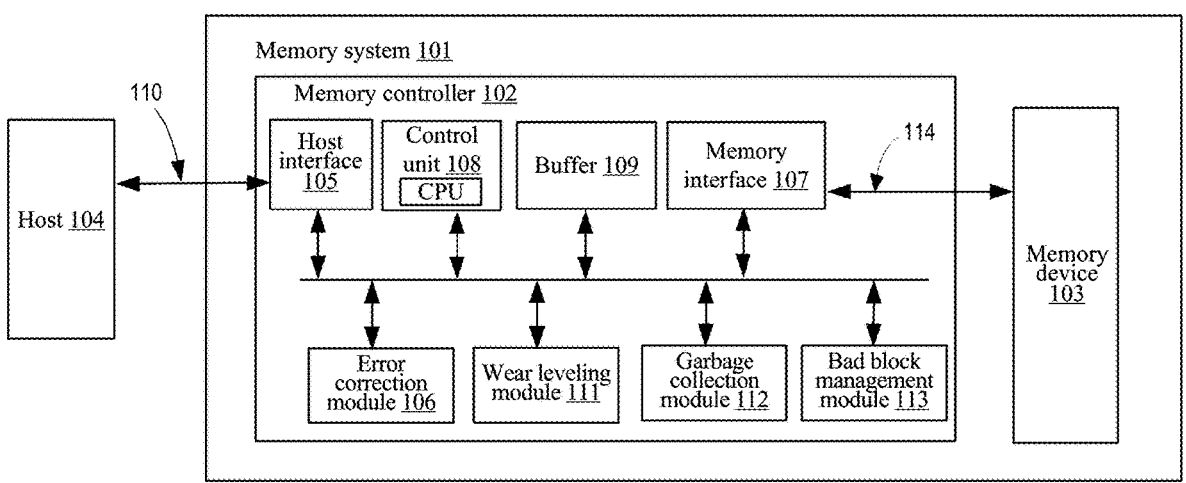
FIG. 12 is a schematic structural diagram of a memory system.

FIG. 12 is a schematic structural diagram of a memory environment 100. The memory environment 100 includes a memory system 101. The memory system 101 comprises a memory controller 102 and a memory device 103. The memory controller 102 is configured to control the memory device 103 to perform read and write operations. The memory controller 102 may be coupled the memory device 103 in any appropriate manner. The memory controller 102 comprises a control unit (CPU) 108, a buffer 109, an error correction module 106, a host interface 105, a memory interface 107, a wear leveling module 111, a garbage collection module 112, and a bad-block management module 113. In the examples of the present disclosure, the memory device 103 may be a semiconductor memory, for example, a NAND memory, that stores data in a non-volatile manner. The memory system 101 is connected to a host 104 via an external bus 110. The host interface 105 outputs a command and valid data (write data), etc. received from the host 104 to the internal bus 114, and sends the valid data (read data) read from the memory device 103, and response from the control unit 108, etc. to the host 104.

The memory interface 107 controls processing of writing and reading the data, etc. to and from the memory device 103 based on an instruction of the control unit 108. The control unit 108 overall controls the memory system 101, and is, for example, a central processing unit (CPU), a micro-processing unit (MPU), etc. The control unit 108 performs control according to a command in the case where it receives the command from the host 104 via the host interface 105. For example, the control unit 108 instructs the memory interface 107 to write the data to the memory device 103 according to a command from the host 104. Furthermore, the control unit 108 instructs the memory interface 107 to read the data from the memory device 103 according to a command from the host 104.

The buffer 109 temporarily saves the data received from the host 104 before storing it to the memory device 103, and temporarily saves the data read from the memory device 103 before sending it to the host 104.

The error correction module 106 is a data codec unit. Because storage of a flash memory has a bit error rate, for accuracy of data, during a data write operation, error checking and correcting (ECC) check protection, which is an encoding process, should be performed on the original data. During read of data, checking and correction also need to be performed through decoding. If the number of incorrect bits exceeds an ECC correction capability, data is uploaded to the host in an "uncorrectable" form. A process of ECC encoding and decoding is completed by the error correction module 106.

Because the flash memory needs to be erased first before write and cannot be overwritten, when a user updates data, an additional space needs to be further found to write new data. Therefore, data in an original space expires and becomes programming garbage, and garbage collection needs to be performed to obtain a new write space. The garbage collection module 112 may be configured to move out valid data on a plurality of flash memory blocks, write the valid data to a new flash memory block, and then erase these flash memory blocks to obtain usable flash memory blocks.

The flash memory has a service life. That is, a memory block of the flash memory has a limited number of erases/writes. If the number of erases/writes of one memory block exceeds a certain value, the memory block becomes not that reliable, or even becomes a usable bad block. The wear leveling module 111 can keep some memory blocks from being frequently erased/written, so that the number of erases/writes of each memory block is kept relatively leveled, to extend the service life of overall chips.

When a flash memory is delivered from a factor, there are inevitably some bad blocks. These are factory bad blocks. With the use of the flash memory, some initial good blocks become bad blocks, and these are grown bad blocks. The bad-block management module 113 may manage the factory bad blocks and the grown bad blocks of the flash memory.

The operations (for example, a data write operation, a data read operation, a data erase operation, and the like) of the memory system may be implemented by running firmware stored in the memory system.

In some examples, the host interface 105 of a memory controller 110 receives memory data to be written that needs to be written to a strip to be written; the control unit 108 of the memory controller 110 generates parity check data of the strip to be written according to the memory data to be written; and the memory interface 107 of the memory controller 110 sends the memory data to be written and the parity check data to the memory device.

Figure 13:
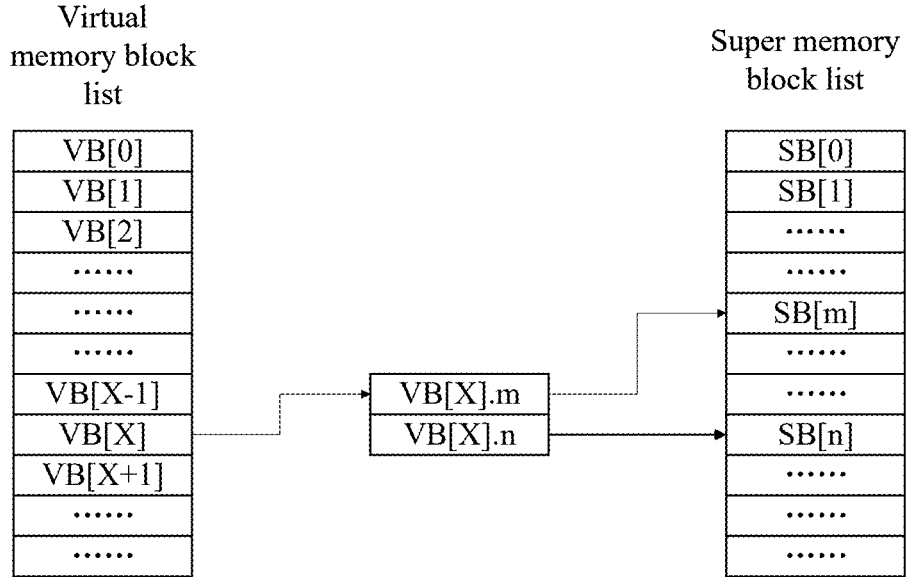
FIG. 13 shows a mapping relationship between a virtual memory block and a super memory block.

In some examples, as shown in FIG. 13, the memory device is configured to store mapping data, the mapping data at least comprises data of a mapping relationship between the virtual memory block and the super memory block, and the memory controller is configured to:

before sending the memory data to be written and the parity check data to the memory device, acquire the mapping data in the memory device; and determine, based on the mapping data and a virtual memory block to which the strip to be written belongs, a super memory block corresponding to the virtual memory block to which the strip to be written belongs.

In the examples of the present disclosure, data is eventually written to a super memory block, and therefore a virtual memory block needs to be mapped back into a super memory block again, to write the data to be written to the super memory block.

In some examples, if two super memory blocks (for example, SB[m] and SB[n]) form one virtual memory block (for example, VB[X]), one virtual memory block (VB[X]) can be mapped back into two super memory blocks (SB[m] and SB[n]) again. The number of super memory blocks of a virtual memory block is not limited in the present disclosure.

In the examples of the present disclosure, a plurality of super memory blocks that form a virtual memory block may be adjacent or may not be adjacent. This is not limited in the present disclosure.

The examples of the present disclosure are described by using an example in which a plurality of super memory blocks that form a virtual memory block are adjacent, a sequence number of one of the adjacent super memory blocks is an odd number, and a sequence number of the other one of the adjacent super memory blocks is an even number. In the examples of the present disclosure, the above-mentioned mapping data may be burned into the memory controller in a mass production phase in combination with information about bad blocks in the memory device. Subsequently, during a power-on and initialization each time, the memory controller may perform an operation of combining a plurality of super memory blocks into a virtual memory block.

In some examples, before the memory interface 107 of the memory controller 110 sends the memory data to be written and the parity check data to the memory device, the memory interface 107 of the memory controller 110 acquires the mapping data in the memory device.

The control unit 108 of the memory controller 110 determines, based on the mapping data and a virtual memory block to which the strip to be written belongs, a super memory block corresponding to the virtual memory block to which the strip to be written belongs.

In some examples, the memory device is configured to store a bad block table, and the memory controller is configured to:

when any one of a read operation, a write operation, and an erase operation performed on a memory block in the memory device fails, cause the bad-block management module 113 in the memory controller 110 label the memory block as a bad block, and update the bad block table.

In some examples, if a read operation or a write operation performed on a memory block in the memory device fails, the garbage collection module 112 in the memory controller 110 first adds the virtual memory block to which a corresponding memory block belongs to a garbage collection pool, and then performs garbage collection on data on the virtual memory block. The bad-block management module 113 in the memory controller 110 labels the memory block as a bad block.

In some examples, when an erase operation performed on a memory block in the memory device fails, the memory block is directly labeled as a bad block.

In some examples, the memory controller is further configured to:

in response to the number of bad blocks in the super memory block being greater than a preset value, replace the super memory block with a redundant super memory block, and update data related to the mapping relationship between the super memory block and the virtual memory block.

Figure 14:
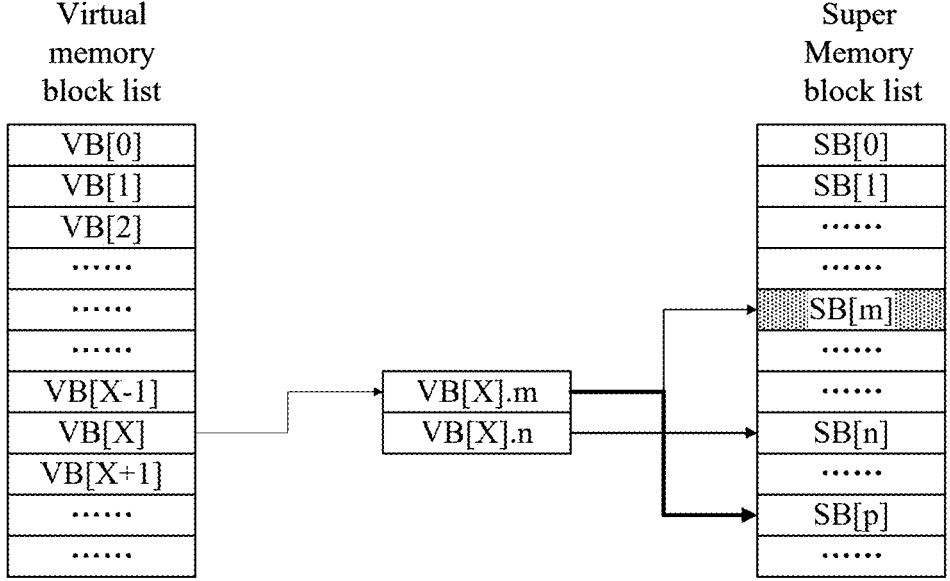
FIG. 14 shows a schematic diagram of replacing a super memory block with a redundant super memory block.

As shown in FIG. 14, if the number of bad blocks in the super memory block SB[m] being greater than a preset value, the super memory block is replaced with a redundant super memory block SB[P], and data related to a mapping relationship between the super memory block and the virtual memory block VB[X] is updated.

In some examples, the memory controller is further configured to:

in response to the number of bad blocks in the super memory block being less than or equal to the preset value, replace the bad block with a redundant memory block, and update data related to a mapping relationship between the super memory block and the memory block.

Figure 15:
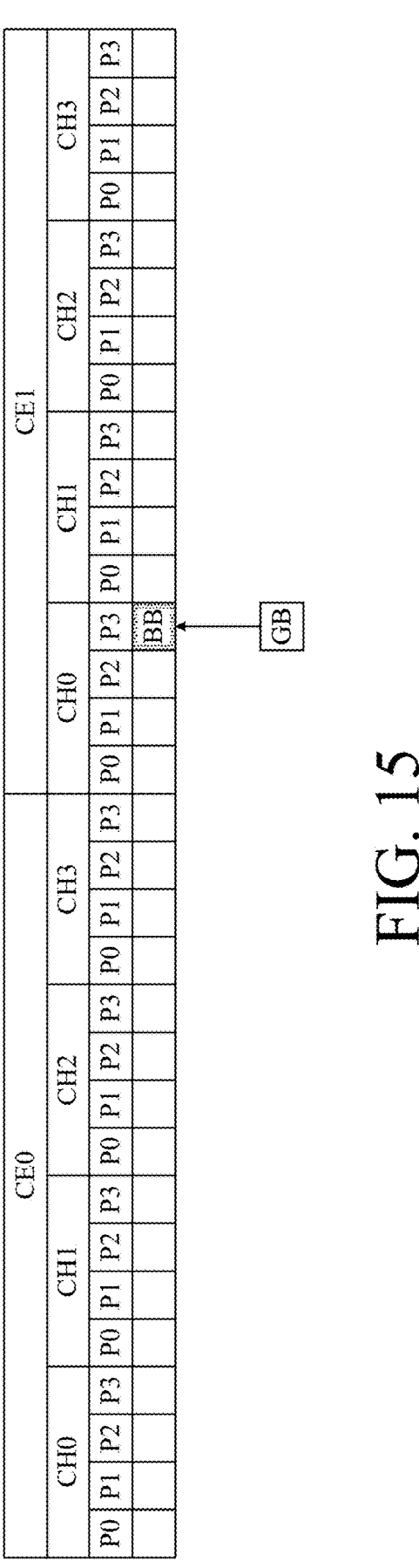
FIG. 15 shows a schematic diagram of replacing one bad block in a super memory block with a redundant memory block.

As shown in FIG. 15, if the number of bad blocks in the super memory blocks being less than or equal to the preset value, one bad block BB in the super memory block is replaced with a redundant memory block GB, and data related to a mapping relationship between the super memory block and the memory block is updated.

The above-mentioned preset value may be set according to an actual requirement, for example, set to 30% of the number of memory blocks comprised in the super memory block.

In some examples, in response to the number of bad blocks in the super memory blocks being greater than a preset value, the bad-block management module 113 of the memory controller 110 replaces the super memory block with a redundant super memory block, and updates data related to a mapping relationship between the super memory block and the virtual memory block. In some examples, the memory controller is configured to:

acquire the bad block table, and acquire, according to the bad block table, information about a bad block in the virtual memory block to which the strip to be written belongs; and determine, based on the bad block table, not to write data to the bad block in the virtual memory block to which the strip to be written belongs.

Bad blocks are generated in a manufacturing process of an SSD. In addition, new bad blocks are also generated in a use process of the SSD. The bad block table records the bad blocks in the manufacturing process of the SSD, and also records the bad blocks generated in the use process of the SSD.

In the examples of the present disclosure, before the memory data to be written and the parity check data are written to the strip to be written, the bad block table further needs to be acquired. The bad block table records positions of bad blocks in the super memory block, that is, records positions of bad blocks in the virtual memory block.

When a write operation is performed on the memory data to be written and the parity check data, data is not written to a bad block in a virtual memory block to which the strip to be written belongs, and data is written to a good block in the virtual memory block to which the strip to be written belongs.

In some examples, the bad-block management module 113 of the memory controller 110 acquires the bad block table, and acquires, according to the bad block table, information about a bad block in the virtual memory block to which the strip to be written belongs.

The bad-block management module 113 of the memory controller 110 determines, based on the bad block table, not to write data to the bad block in the virtual memory block to which the strip to be written belongs.

In some examples, one physical page of the strip is configured to store the parity check data, and other physical pages of the strip are configured to store memory data, and the memory controller is configured to:

when memory data stored in one physical page of the strip is lost, perform a data recovery operation on the lost memory data of the strip by using the parity check data in the strip and the memory data stored in the other physical pages of the strip.

Parity check data stored in one physical page of a strip is obtained by performing a logical operation, for example, an exclusive OR operation, according to data stored in other physical pages of the strip. Therefore, when data in any physical page (which is not a physical page configured to store parity check data) in the strip is lost, the data recovery operation may be performed on the lost data of the strip by performing a logical operation (for example, an exclusive OR operation) according to data stored in remaining physical pages in the strip. In this way, even if a problem of a data loss occurs on a physical page in a strip, data of the physical page can be recovered, thereby improving the validity of data.

In some examples, when memory data stored in one physical page of the strip is lost, the error correction module 106 in the memory controller 110 performs a data recovery operation on the lost memory data of the strip by using the parity check data in the strip and the memory data stored in the other physical pages of the strip.

In some examples, every two super memory blocks form one virtual memory block, and each of the word lines of each of the memory planes in each of the virtual memory blocks is coupled with 2M physical pages that are sequentially arranged in a sequence from 0 to 2M−1, wherein the physical page whose sequence number is an even number and the physical page whose sequence number is an odd number belong to different super memory blocks respectively.

In the examples of the present disclosure, an example in which M=6 is used for description. It should be understood that, the value of M is not limited in the examples of the present disclosure.

With reference to FIG. 9, each word line in a memory block [m] is coupled with six physical pages that are sequentially arranged in a sequence from 0 to 5. Each word line in a memory block [n] is also coupled with six physical pages that are sequentially arranged in a sequence from 0 to 5. m is an even number, and n is an odd number. The memory block [m] is from a super memory block [m], that is, the sequence number of the super memory block [m] is an even number, for example, SB[0]. The memory block [n] is from a super memory block [n], that is, the sequence number of the super memory block [n] is an odd number, for example, SB[1].

The memory block [m] and the memory block [n] of a same Die-Plane (for example, Die0-Plane0) in SB[0] and SB[1] are combined below, to form one virtual sub-memory block in a virtual memory block [M].

A physical page whose sequence number is 0 coupled with a word line WL0 in the memory block [m] forms a virtual sub-physical page whose sequence number is 0 coupled with the word line WL0 in one virtual sub-memory block in the virtual memory block [M]. A physical page whose sequence number is 0 coupled with a word line WL0 in the memory block [n] forms a virtual sub-physical page whose sequence number is 1 coupled with the word line WL0 in one virtual sub-memory block in the virtual memory block [M]. A physical page whose sequence number is 1 coupled with the word line WL0 in the memory block [m] forms a virtual sub-physical page whose sequence number is 2 coupled with the word line WL0 in one virtual sub-memory block in the virtual memory block [M]. A physical page whose sequence number is 1 coupled with a word line WL0 in the memory block [n] forms a virtual sub-physical page whose sequence number is 3 coupled with the word line WL0 in one virtual sub-memory block in the virtual memory block [M]. By analogy, a physical page whose sequence number is 5 coupled with the word line WL0 in the memory block [m] forms a virtual sub-physical page whose sequence number is 10 coupled with the word line WL0 in one virtual sub-memory block in the virtual memory block [M]. A physical page whose sequence number is 5 coupled with a word line WL0 in the memory block [n] forms a virtual sub-physical page whose sequence number is 11 coupled with the word line WL0 in one virtual sub-memory block in the virtual memory block [M].

Physical pages whose sequence numbers are even numbers, that is, 0, 2, 4, 6, 8, and 10, in one virtual sub-memory block in the virtual memory block [M] are all from the memory block [m]. Physical pages whose sequence numbers are odd numbers, that is, 1, 3, 5, 7, 9, 11, in one virtual sub-memory block in the virtual memory block [M] are all from the memory block [n]. That is, the virtual sub-physical page whose sequence number is an even number and the virtual sub-physical page whose sequence number is an odd number belong to different super memory blocks respectively.

In some examples, the memory device comprises P virtual memory blocks sequentially arranged in a sequence from 0 to P−1, P is a positive integer, and the memory controller is configured to:

determine a write sequence for writing data to the memory device, wherein the write sequence comprises: virtual memory block sequence numbers of a plurality of virtual memory blocks are in ascending sequence, word line sequence numbers of a plurality of word lines of each virtual memory block are in ascending sequence, and sequence numbers of physical pages coupled with each word line are in ascending sequence.

A write sequence of a virtual memory block is similar to a write sequence of a super memory block in the examples of the present disclosure. A difference lies in that the write of a virtual memory block involves a plurality of super memory blocks. However, the write sequence of each super memory block is still an ascending order of word line sequence numbers in a plurality of word lines in each super memory block and an ascending order of sequence numbers of physical pages coupled with each word line.

In some examples, the control unit 108 in the memory controller 110 determines a write sequence for writing data to the memory device.

In some examples, the control unit 108 of the memory controller 110 is configured to:

in response to a re-power on after a power failure, sequentially test the P virtual memory blocks starting from the virtual memory block whose sequence number is 0, and determine a target virtual physical page, wherein the target virtual physical page is the virtual physical page being programmed at the time of the power failure;

in response to the virtual physical page whose sequence number is 0 coupled with the word line whose sequence number is 0 in the virtual memory block whose sequence number is x being in an erased state, determine that the virtual memory block whose sequence number is x is not a virtual memory block to which the target virtual physical page belongs, wherein 0≤x≤P;

or in response to the virtual physical page whose sequence number is 0 coupled with the word line whose sequence number is 0 in the virtual memory block whose sequence number is x being in a programmed state and in response to the virtual physical page whose sequence number is 2M−1 coupled with the word line whose sequence number is N−1 in the virtual memory block whose sequence number is x being in a programmed state, determine that the virtual memory block whose sequence number is x is not the virtual memory block to which the target virtual physical page belongs, wherein 0≤x≤P−1; and continue to test the virtual physical page whose sequence number is 0 coupled with the word line whose sequence number is 0 in the virtual memory block whose sequence number is x+1.

After a power failure occurs on the memory device, a write recovery operation needs to be performed on the target virtual physical page, that is, a virtual memory page on which data is being written or that is being programmed at the time of the power failure. Therefore, the target virtual physical page needs to be found first.

As discussed above, the write sequence for writing data to the memory device comprises: virtual memory block sequence numbers of a plurality of virtual memory blocks are in ascending sequence, word line sequence numbers of a plurality of word lines of each virtual memory block are in ascending sequence, and sequence numbers of physical pages coupled with each word line are in ascending sequence.

Figure 16:
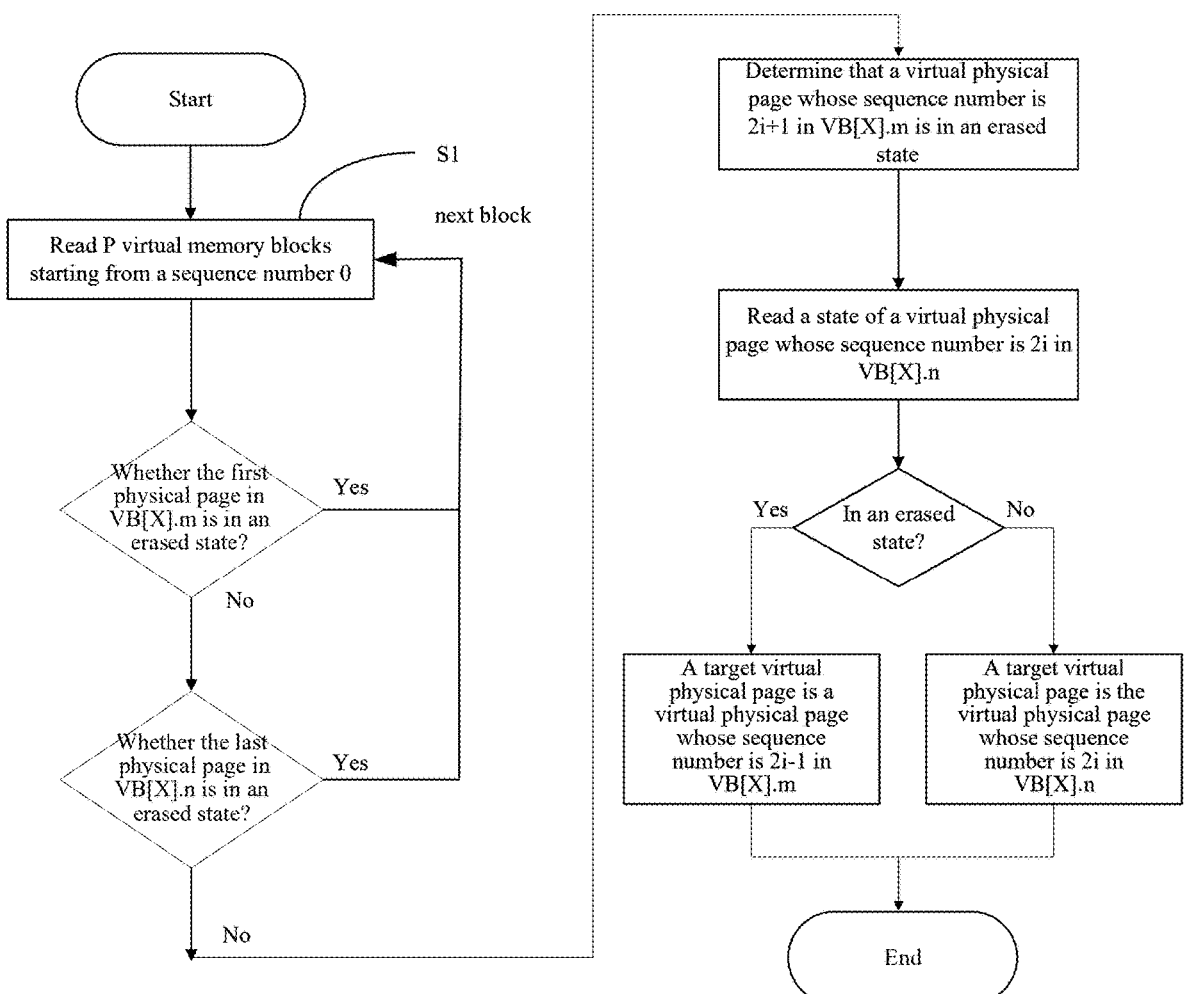
FIG. 16 shows a schematic flowchart of determining a target virtual physical page upon a re-power on after a power failure.

As shown in FIG. 16, the P virtual memory blocks are sequentially tested starting from a virtual memory block whose sequence number is 0, to determine a target virtual physical page.

If the virtual physical page whose sequence number is 0 coupled with the word line whose sequence number is 0 in the virtual memory block whose sequence number is x, that is, the first virtual physical page, is in an erased state, it is determined that the virtual memory block whose sequence number is x is not a virtual memory block to which the target virtual physical page belongs. The reason is that the virtual memory block undergoes no data write and therefore is not an open memory block.

If the virtual physical page whose sequence number is 0 coupled with the word line whose sequence number is 0 in the virtual memory block whose sequence number is x is in a programmed state and the virtual physical page whose sequence number is 2M−1 coupled with the word line whose sequence number is N−1 in the virtual memory block whose sequence number is x, that is, the last virtual physical page, is in a programmed state, it is determined that the virtual memory block whose sequence number is x is not a virtual memory block to which the target virtual physical page belongs. The reason is that the virtual memory block has been completely fully written, and therefore the virtual memory block is also not an open block.

That is, it is determined, by scanning and reading the first virtual physical page and the last virtual physical page of a virtual memory block, whether the virtual memory block is an open block. If the virtual memory block is not an open block, a target virtual physical page does not exist in the virtual memory block. If the virtual memory block is an open block, a position of the target virtual physical page continues to be determined.

In some examples, the control unit 108 of the memory controller 110 is configured to:

in response to the virtual physical page whose sequence number is 0 coupled with the word line whose sequence number is 0 in the virtual memory block whose sequence number is x being in a programmed state and in response to the virtual physical page whose sequence number is 2M−1 coupled with the word line whose sequence number is N−1 in the virtual memory block whose sequence number is x being in an erased state, determine that the virtual memory block whose sequence number is x is the virtual memory block to which the target virtual physical page belongs;

test a virtual physical page whose sequence number is an odd number in the virtual memory block to which the target virtual physical page belongs;

when it is determined that the virtual physical page whose sequence number is 2i+1 in the virtual memory block to which the target virtual physical page belongs is in an erased state, test the virtual physical page whose sequence number is 2i in the virtual memory block to which the target virtual physical page belongs;

when the virtual physical page whose sequence number is 2i in the virtual memory block to which the target virtual physical page belongs is in an erased state, determine that the virtual physical page whose sequence number is 2i−1 in the virtual memory block to which the target virtual physical page belongs is the target virtual physical page; and when the virtual physical page whose sequence number is 2i in the virtual memory block to which the target virtual physical page belongs is in a programmed state, determine that the virtual physical page whose sequence number is 2i in the virtual memory block to which the target virtual physical page belongs is the target virtual physical page.

In the examples of the present disclosure, instead of sequential testing an open block in ascending order of sequence numbers (0, 1, 2, . . . ), virtual physical pages whose sequence number is an odd number in an open block are tested first, so that search efficiency can be improved, and a search time can be reduced.

When it is determined that a virtual physical page whose sequence number is 2i+1 in the virtual memory block to which the target virtual physical page belongs is in an erased state, a virtual physical page whose sequence number is 2i continues to be tested, and a target virtual physical page may be determined by using a state of the virtual physical page whose sequence number is 2i. If the virtual physical page whose sequence number is 2i+1 and the virtual physical page whose sequence number is 2i are both in an erased state, a virtual physical page whose sequence number is 2i−1 is a target virtual physical page. If the virtual physical page whose sequence number is 2i+1 is in an erased state and the virtual physical page whose sequence number is 2i is in a programmed state, the virtual physical page whose sequence number is 2i is a target virtual physical page.

In some examples, the memory system comprises a memory card or a solid-state disk.

Examples of the present disclosure further provide a storage device, comprising at least one memory device, wherein each memory device comprises a memory array and a peripheral circuit coupled with the memory array; the memory array comprises a plurality of memory planes, each of the memory planes comprises K memory blocks, each of the memory blocks comprises N word lines, each of the word lines is coupled with M physical pages, the k$^{th}$ memory blocks in respective memory planes in the at least one memory device form one super memory block, a plurality of super memory blocks form one virtual memory block, the physical pages coupled with the n$^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m \leq M$, and $1 \leq k \leq K$; and the peripheral circuit is configured to:

receive parity check data and memory data to be written that needs to be written to a strip to be written; and write the memory data to be written and the parity check data to the strip to be written.

In one aspect, because a plurality of physical pages comprised in a strip provided in examples of the present disclosure are from different memory blocks, by writing memory data to be written and parity check data into the strip provided in the present disclosure, it is possible to avoid the situation that data not being able to be corrected due to the leakage occurs in a plurality of word lines in the same memory block. In another aspect, low over-provisioning usage and low buffer usage can further be enabled by using the strip provided in the examples of the present disclosure, so that more valid data can be stored, and a buffer with a smaller size can be used.

In some examples, the memory array is configured to store mapping data, the mapping data at least comprises data of a mapping relationship between the virtual memory block and the super memory block, and the peripheral circuit is configured to:

receive a command that the memory data and the parity check data need to be written to a virtual memory block to which the strip to be written belongs; and send the mapping data to a memory controller coupled with the memory device.

In some examples, every two super memory blocks form one virtual memory block, and each of the word lines of each of the memory planes in each of the virtual memory blocks is coupled with 2M physical pages that are sequentially arranged in a sequence from 0 to 2M−1, wherein the physical page whose sequence number is an even number and the physical page whose sequence number is an odd number belong to different super memory blocks respectively.

Figure 17:
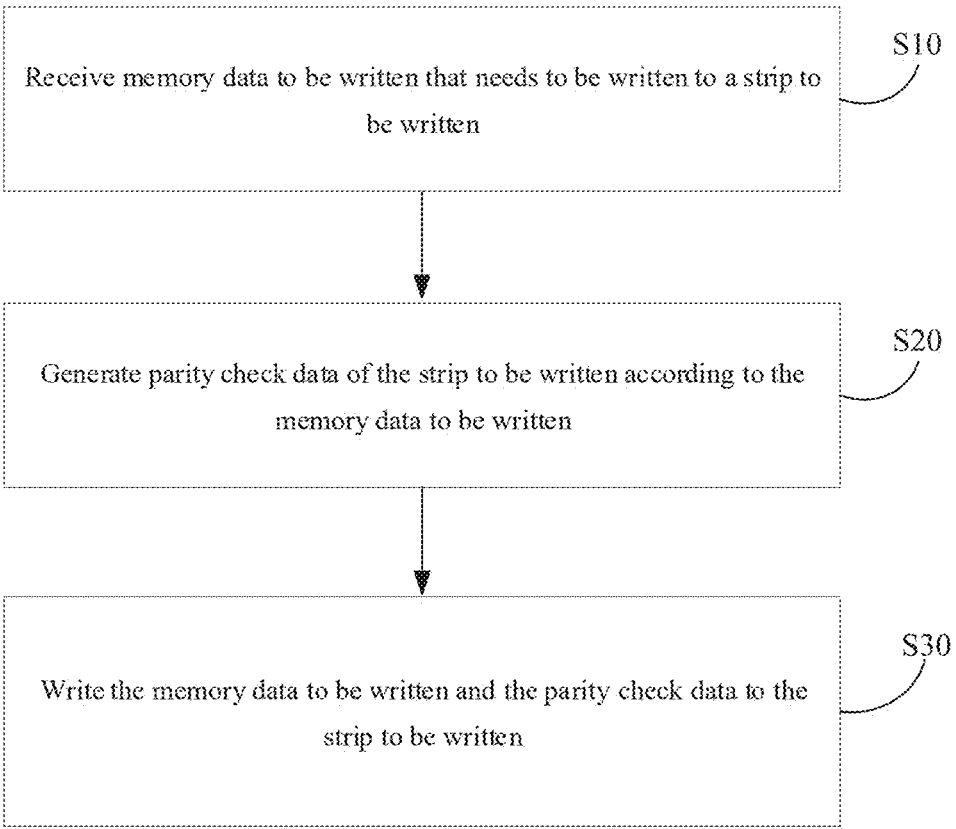
FIG. 17 is a schematic flowchart of an operation method of a memory system provided by an example of the present disclosure.

Examples of the present disclosure further provide an operation method of a memory system, wherein the memory system comprises at least one memory device and a memory controller coupled with the memory device, wherein the memory device comprises a plurality of memory planes, each of the memory planes comprises K memory blocks, each of the memory blocks comprises N word lines, each of the word lines is coupled with M physical pages, the k$^{th}$ memory blocks in respective memory planes in the at least one memory device form one super memory block, a plurality of super memory blocks form one virtual memory block, the m$^{th}$ physical pages coupled with the n$^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m \leq M$, and $1 \leq k \leq K$; and the method shown in FIG. 17 comprises:

operation S10: receiving memory data to be written that needs to be written to a strip to be written;

operation S20: generating parity check data of the strip to be written according to the memory data to be written; and operation S30: writing the memory data to be written and the parity check data into the strip to be written.

In one aspect, because a plurality of physical pages comprised in a strip provided in examples of the present disclosure are from different memory blocks, by writing memory data to be written and parity check data into the strip provided in the present disclosure, it is possible to avoid the situation that data not being able to be corrected due to the leakage occurs in a plurality of word lines in the same memory block. In another aspect, low over-provisioning usage and low buffer usage can further be enabled by using the strip provided in the examples of the present disclosure, so that more valid data can be stored, and a buffer with a smaller size can be used.

In some examples, the memory device is configured to store mapping data, the mapping data at least comprises data of a mapping relationship between the virtual memory block and the super memory block, and the writing the memory data to be written and the parity check data into the strip to be written comprises:

acquiring the mapping data in the memory device;

determining, based on the mapping data, a super memory block corresponding to a virtual memory block to which the strip to be written belongs; and writing the memory data to be written and the parity check data into a super memory block corresponding to the virtual memory block to which the strip to be written belongs.

In some examples, the memory device is configured to store a bad block table, and the method further comprises:

in response to any one of a read operation, a write operation, and an erase operation performed on a memory block in the memory device fails, labeling the memory block as a bad block, and updating the bad block table.

In some examples, the method further comprises:

in response to the number of bad blocks in the super memory block being greater than a preset value, replacing the super memory block with a redundant super memory block, and updating data related to the mapping relationship between the super memory block and the virtual memory block; and in response to the number of bad blocks in the super memory block being less than or equal to the preset value, replacing the bad block with a redundant memory block, and updating data related to a mapping relationship between the super memory block and the memory block.

In some examples, the method further comprises:

acquiring the bad block table, and acquiring, according to the bad block table, information about a bad block in the virtual memory block to which the strip to be written belongs; and determining, based on the bad block table, not to write data to the bad block in the virtual memory block to which the strip to be written belongs.

In some examples, the method further comprises: when memory data stored in one physical page of the strip is lost, performing a data recovery operation on the lost memory data of the strip by using the parity check data in the strip and the memory data stored in other physical pages of the strip.

In some examples, the memory device comprises P virtual memory blocks sequentially arranged in a sequence from 0 to P−1, P is a positive integer, and the writing the memory data to be written and the parity check data into the strip to be written comprises:

writing the memory data to be written and the parity check data to the strip to be written in a write sequence, wherein the write sequence comprises: virtual memory block sequence numbers of a plurality of virtual memory blocks are in ascending sequence, word line sequence numbers of a plurality of word lines of each virtual memory block are in ascending sequence, and sequence numbers of physical pages coupled with each word line are in ascending sequence.

In some examples, the method further comprises:

in response to a re-power on after a power failure, sequentially testing the P virtual memory blocks starting from the virtual memory block whose sequence number is 0, and determining a target virtual physical page, wherein the target virtual physical page is the virtual physical page being programmed at the time of the power failure.

In some examples, the determining a target virtual physical page comprises:

determining a target virtual memory block to which the target virtual physical page belongs; and determining the target virtual physical page in the target virtual memory block.

In some examples, the determining a target virtual memory block to which the target virtual physical page belongs comprises:

in response to the virtual physical page whose sequence number is 0 coupled with the word line whose sequence number is 0 in the virtual memory block whose sequence number is x being in an erased state, determining that the virtual memory block whose sequence number is x is not a virtual memory block to which the target virtual physical page belongs, wherein $0 \leq x \leq P$; or in response to the virtual physical page whose sequence number is 0 coupled with the word line whose sequence number is 0 in the virtual memory block whose sequence number is x being in a programmed state and in response to the virtual physical page whose sequence number is 2M−1 coupled with the word line whose sequence number is N−1 in the virtual memory block whose sequence number is x being in a programmed state, determining that the virtual memory block whose sequence number is x is not the virtual memory block to which the target virtual physical page belongs, wherein $0 \leq x \leq P-1$;

continuing to test the virtual physical page whose sequence number is 0 coupled with the word line whose sequence number is 0 in the virtual memory block whose sequence number is x+1; and in response to the virtual physical page whose sequence number is 0 coupled with the word line whose sequence number is 0 in the virtual memory block whose sequence number is x being in a programmed state and in response to the virtual physical page whose sequence number is 2M−1 coupled with the word line whose sequence number is N−1 in the virtual memory block whose sequence number is x being in an erased state, determining that the virtual memory block whose sequence number is x is the virtual memory block to which the target virtual physical page belongs.

In some examples, the determining the target virtual physical page in the target virtual memory block comprises:

testing a virtual physical page whose sequence number is an odd number in the virtual memory block to which the target virtual physical page belongs;

when it is determined that the virtual physical page whose sequence number is $2i+1$ in the virtual memory block to which the target virtual physical page belongs is in an erased state, testing the virtual physical page whose sequence number is $2i$ in the virtual memory block to which the target virtual physical page belongs;

when the virtual physical page whose sequence number is $2i$ in the virtual memory block to which the target virtual physical page belongs is in an erased state, determining that the virtual physical page whose sequence number is $2i-1$ in the virtual memory block to which the target virtual physical page belongs is the target virtual physical page; and when the virtual physical page whose sequence number is $2i$ in the virtual memory block to which the target virtual physical page belongs is in a programmed state, determining that the virtual physical page whose sequence number is $2i$ in the virtual memory block to which the target virtual physical page belongs is the target virtual physical page.

Examples of the present disclosure provide an operation method of a storage device, the memory device comprising at least one memory device, wherein each memory device comprises a memory array and a peripheral circuit coupled with the memory array; the memory array comprises a plurality of memory planes, each of the memory planes comprises K memory blocks, each of the memory blocks comprises N word lines, each of the word lines is coupled with M physical pages, the $k^{th}$ memory blocks in respective memory planes in the at least one memory device form one super memory block, a plurality of super memory blocks form one virtual memory block, the $m^{th}$ physical pages coupled with the $n^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m \leq M$, and $1 \leq k \leq K$; and the method comprises:

receiving parity check data and memory data to be written that needs to be written to a strip to be written; and writing the memory data to be written and the parity check data to the strip to be written.

With respect to the method in the above examples, its implementation method has been described in detail in the examples of the product corresponding to the method, and will not be set forth and illustrated in detail here.

In view of this, examples of the present disclosure provide a memory system and an operation method thereof and a memory device and an operation method thereof.

According to a first aspect, examples of the present disclosure provide a memory system, comprising at least one memory device, wherein each memory device comprises a plurality of memory planes, each of the memory planes comprises K memory blocks, each of the memory blocks comprises N word lines, each of the word lines is coupled with M physical pages, the $k^{th}$ memory blocks in respective memory planes in the at least one memory device form one super memory block, a plurality of super memory blocks form one virtual memory block, the $m^{th}$ physical pages coupled with the $n^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m$ &M, and $1 \leq k \leq K$; and a memory controller coupled with the at least one memory device and configured to: receive memory data to be written that needs to be written to a strip to be written; generate parity check data of the strip to be written according to the memory data to be written; and send the memory data to be written and the parity check data to the memory device.

According to a second aspect, examples of the present disclosure further provide a storage device, comprising at least one memory device, wherein each memory device comprises: a memory array comprises a plurality of memory planes, each of the memory planes comprises K memory blocks, each of the memory blocks comprises N word lines, each of the word lines is coupled with M physical pages, the $k^{th}$ memory blocks in respective memory planes in the at least one memory device form one super memory block, a plurality of super memory blocks form one virtual memory block, the physical pages coupled with the $n^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m \leq M$, and $1 \leq k \leq K$; and a peripheral circuit coupled with the memory array and configured to: receive parity check data and memory data to be written that needs to be written to a strip to be written; and write the memory data to be written and the parity check data to the strip to be written.

According to a third aspect, examples of the present disclosure further provide an operation method of a memory system, wherein the memory system comprises: at least one memory device, wherein the memory device comprises a plurality of memory planes, each of the memory planes comprises K memory blocks, each of the memory blocks comprises N word lines, each of the word lines is coupled with M physical pages, the $k^{th}$ memory blocks in respective memory planes in the at least one memory device form one super memory block, a plurality of super memory blocks form one virtual memory block, the $m^{th}$ physical pages coupled with the $n^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m \leq M$, and $1 \leq k \leq K$; and a memory controller coupled with the memory device, and the method comprises: receiving memory data to be written that needs to be written to a strip to be written; generating parity check data of the strip to be written according to the memory data to be written; and writing the memory data to be written and the parity check data into the strip to be written.

According to a fourth aspect, examples of the present disclosure further provide an operation method of a storage device, wherein the storage device comprises at least one memory device, and each memory device comprises: a memory array comprises a plurality of memory planes, each of the memory planes comprises K memory blocks, each of the memory blocks comprises N word lines, each of the word lines is coupled with M physical pages, the $k^{th}$ memory blocks in respective memory planes in the at least one memory device form one super memory block, a plurality of super memory blocks form one virtual memory block, the $m^{th}$ physical pages coupled with the $n^{th}$ word lines in each of the memory planes from a same super memory block in each virtual memory block form one virtual physical page, the virtual physical pages from different super memory blocks in a same virtual memory block form one strip, and M, N, and K are positive integers, $1 \leq n \leq N$, $1 \leq m \leq M$, and $1 \leq k \leq K$; and a peripheral circuit coupled with the memory array, and the method comprises: receiving parity check data and memory data to be written that needs to be written to a strip to be written; and writing the memory data to be written and the parity check data to the strip to be written.

The examples of the present disclosure provide a memory system. In one aspect, because a plurality of physical pages comprised in a strip provided in examples of the present disclosure are from different memory blocks, by writing memory data to be written and parity check data into the strip provided in the present disclosure, it is possible to avoid the situation that data not being able to be corrected due to the leakage occurs in a plurality of word lines in the same memory block. In another aspect, low over-provisioning usage and low buffer usage can further be enabled by using the strip provided in the examples of the present disclosure, so that more valid data can be stored, and a buffer with a smaller size can be used.

It is to be understood that, references to "one example" or "an example" throughout this specification mean that particular features, structures, or characteristics related to the example are comprised in at least one example of the present disclosure. Therefore, "in one example" or "in an example" presented everywhere throughout this specification does not necessarily refer to the same example. Furthermore, these particular features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

It is to be noted that, the terms "include", "comprise" or any variants thereof herein are intended to cover non-exclusive inclusion, such that a process, a method, an article or a device comprising a series of elements comprise not only those elements, but also other elements not listed explicitly, or elements inherent to this process, method, article or device. An element defined by a statement "comprising one" do not preclude the presence of another identical element in the process, method, article or device comprising this element, without more limitations.

The above descriptions are merely examples of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory system, comprising:
at least one memory device, wherein each of the at least one memory device includes a plurality of memory planes, each memory plane of the plurality of memory planes includes K memory blocks, each of the K memory blocks includes N word lines, each of the N word lines is coupled with M physical pages, a number of the K memory blocks in respective memory planes in the at least one memory device form one super memory block, a plurality of super memory blocks form one virtual memory block, a number of the M physical pages coupled with a number of the N word lines in each of the memory planes from a same super memory block in each virtual memory block form one virtual physical page, virtual physical pages adjacent to each other in a wordline direction and located in different virtual strings from different super memory blocks in a same virtual memory block form one strip, and M, N, and K are positive integers, $1 \leq n \leq N$, $1 \leq m \leq M$, and $1 \leq k \leq K$; and a memory controller coupled with the at least one memory device and configured to:
receive memory data to be written to the strip;
generate parity check data of the strip according to the memory data; and
send the memory data and the parity check data to the at least one memory device.

2. The memory system of claim 1, wherein the at least one memory device is configured to store mapping data, the mapping data at least includes data of a mapping relationship between the virtual memory block and the super memory block, and the memory controller is configured to:
before sending the memory data and the parity check data to the at least one memory device, acquire the mapping data in the at least one memory device; and
determine, based on the mapping data and the virtual memory block to which the strip belongs, a super memory block corresponding to the virtual memory block to which the strip belongs.

3. The memory system of claim 2, wherein the at least one memory device is configured to store a bad block table, and the memory controller is configured to, when any one of a read operation, a write operation, and an erase operation performed on a memory block of the K memory blocks in the at least one memory device fails, label the memory block as a bad block, and update the bad block table.

4. The memory system of claim 3, wherein the memory controller is further configured to:
in response to a number of bad blocks in the super memory block being greater than a preset value, replace the super memory block with a redundant super memory block, and update data related to the mapping relationship between the super memory block and the virtual memory block; and
in response to the number of bad blocks in the super memory block being less than or equal to the preset value, replace the bad block with a redundant memory block, and update data related to the mapping relationship between the super memory block and the memory block.

5. The memory system of claim 3, wherein the memory controller is configured to:
acquire the bad block table, and acquire, according to the bad block table, information about the bad block in the virtual memory block to which the strip belongs; and
determine, based on the bad block table, not to write data to the bad block in the virtual memory block to which the strip belongs.

6. The memory system of claim 1, wherein a first virtual physical page of the strip is configured to store the parity check data, and a second virtual physical page of the strip is configured to store the memory data, and the memory controller is configured to, when the memory data stored in the second virtual physical page of the strip is lost, perform a data recovery operation on the lost memory data of the strip by using the parity check data in the strip and the memory data stored in other second virtual physical pages of the strip.

7. The memory system of claim 1, wherein every two super memory blocks form the virtual memory block, and each word line of each of the memory planes in the virtual memory block is coupled with 2M physical pages that are sequentially arranged in a sequence from 0 to 2M−1, wherein the 2M physical pages whose sequence number is an even number and the 2M physical pages whose sequence number is an odd number belong to different super memory blocks, respectively.

8. The memory system of claim 7, wherein the at least one memory device includes P virtual memory blocks sequentially arranged in a sequence from 0 to P−1, P is a positive integer, and the memory controller is configured to determine a write sequence for writing data to the at least one memory device, wherein the write sequence includes: virtual memory block sequence numbers of a plurality of virtual memory blocks arranged in an ascending sequence, word line sequence numbers of a plurality of word lines of each virtual memory block arranged in the ascending sequence, and sequence numbers of physical pages coupled with each word line arranged in the ascending sequence.

9. The memory system of claim 8, wherein the memory controller is configured to:

in response to a re-power on after a power failure, sequentially test the P virtual memory blocks starting from the virtual memory block whose sequence number is 0, and determine a target virtual physical page, wherein the target virtual physical page is the virtual physical page being programmed at the time of the power failure;

in response to the virtual physical page whose sequence number is 0 coupled with a word line whose sequence number is 0 in the virtual memory block whose sequence number is x being in an erased state, determine that the virtual memory block whose sequence number is x is not the virtual memory block to which the target virtual physical page belongs, wherein 0≤x≤P; or in response to the virtual physical page whose sequence number is 0 coupled with the word line whose sequence number is 0 in the virtual memory block whose sequence number is x being in a programmed state and in response to the virtual physical page whose sequence number is 2M−1 coupled with the word line whose sequence number is N−1 in the virtual memory block whose sequence number is x being in the programmed state, determine that the virtual memory block whose sequence number is x is not the virtual memory block to which the target virtual physical page belongs, wherein 0≤x≤P−1; and continue to test the virtual physical page whose sequence number is 0 coupled with the word line whose sequence number is 0 in the virtual memory block whose sequence number is x+1.

10. The memory system of claim 9, wherein the memory controller is configured to:

in response to the virtual physical page whose sequence number is 0 coupled with the word line whose sequence number is 0 in the virtual memory block whose sequence number is x being in the programmed state and in response to the virtual physical page whose sequence number is 2M−1 coupled with the word line whose sequence number is N−1 in the virtual memory block whose sequence number is x being in the erased state, determine that the virtual memory block whose sequence number is x is the virtual memory block to which the target virtual physical page belongs;

test the virtual physical page whose sequence number is an odd number in the virtual memory block to which the target virtual physical page belongs;

when it is determined that the virtual physical page whose sequence number is 2i+1 in the virtual memory block to which the target virtual physical page belongs is in the erased state, test the virtual physical page whose sequence number is 2i in the virtual memory block to which the target virtual physical page belongs;

when the virtual physical page whose sequence number is 2i in the virtual memory block to which the target virtual physical page belongs is in the erased state, determine that the virtual physical page whose sequence number is 2i−1 in the virtual memory block to which the target virtual physical page belongs is the target virtual physical page; and when the virtual physical page whose sequence number is 2i in the virtual memory block to which the target virtual physical page belongs is in the programmed state, determine that the virtual physical page whose sequence number is 2i in the virtual memory block to which the target virtual physical page belongs is the target virtual physical page.

11. The memory system of claim 1, wherein the memory system includes a memory card or a solid-state disk.

12. A storage device, comprising at least one memory device, wherein each of the at least one memory device includes:

a memory array including a plurality of memory planes, each memory plane of the plurality of memory planes includes K memory blocks, each of the K memory blocks includes N word lines, each of the N word lines is coupled with M physical pages, a number of the K memory blocks in respective memory planes in the at least one memory device form one super memory block, a plurality of super memory blocks form one virtual memory block, a number of the M physical pages coupled with the N word lines in each of the memory planes from a same super memory block in each virtual memory block form one virtual physical page, virtual physical pages adjacent to each other in a wordline direction and located in different virtual strings from different super memory blocks in a same virtual memory block form one strip, and M, N, and K are positive integers, 1≤n≤N, 1≤m≤M, and 1≤k≤K; and a peripheral circuit coupled with the memory array and configured to:

receive parity check data and memory data that needs to be written to the strip; and write the memory data and the parity check data to the strip.

13. The storage device of claim 12, wherein the memory array is configured to store mapping data, the mapping data at least includes data of a mapping relationship between the virtual memory block and the super memory block, and the peripheral circuit is configured to:

receive a command to write the memory data and the parity check data to the virtual memory block to which the strip belongs; and send the mapping data to a memory controller coupled with the at least one memory device.

14. The storage device of claim 12, wherein every two super memory blocks form the virtual memory block, and each word line of each of the memory planes in the virtual memory block is coupled with 2M physical pages that are sequentially arranged in a sequence from 0 to 2M–1, wherein the 2M physical pages whose sequence number is an even number and the 2M physical pages whose sequence number is an odd number belong to different super memory blocks, respectively.

15. An operation method of a memory system, wherein the memory system comprises:

at least one memory device, wherein the at least one memory device includes a plurality of memory planes, each memory plane of the plurality of memory planes includes K memory blocks, each of the K memory blocks includes N word lines, each of the N word lines is coupled with M physical pages, a number of the K memory blocks in respective memory planes in the at least one memory device form one super memory block, a plurality of super memory blocks form one virtual memory block, a number of the M physical pages coupled with a number of the N word lines in each of the memory planes from a same super memory block in each virtual memory block form one virtual physical page, virtual physical pages adjacent to each other in a wordline direction and located in different virtual strings from different super memory blocks in a same virtual memory block form one strip, and M, N, and K are positive integers, $1 \leq n \leq N$, $1 \leq m \leq M$, and $1 \leq k \leq K$; and a memory controller coupled with the at least one memory device, and the method includes:

receiving memory data to be written to the strip;

generating parity check data of the strip according to the memory data; and writing the memory data and the parity check data into the strip.

16. The operation method of the memory system of claim 15, wherein the at least one memory device is configured to store mapping data, the mapping data at least includes data of a mapping relationship between the virtual memory block and the super memory block, and the writing the memory data to be written and the parity check data into the strip to be written includes:

acquiring the mapping data in the at least one memory device;

determining, based on the mapping data, a super memory block corresponding to the virtual memory block to which the strip belongs; and writing the memory data and the parity check data into the super memory block corresponding to the virtual memory block to which the strip belongs.

17. The operation method of the memory system of claim 16, wherein the at least one memory device is configured to store a bad block table, and the method further includes, in response to any one of a read operation, a write operation, and an erase operation performed on a memory block of the K memory blocks in the at least one memory device fails, labeling the memory block as a bad block, and updating the bad block table.

18. The operation method of the memory system of claim 17, wherein the method further includes:

in response to a number of bad blocks in the super memory block being greater than a preset value, replacing the super memory block with a redundant super memory block, and updating data related to the mapping relationship between the super memory block and the virtual memory block; and in response to the number of bad blocks in the super memory block being less than or equal to the preset value, replacing the bad block with a redundant memory block, and updating data related to the mapping relationship between the super memory block and the memory block.

19. The operation method of the memory system of claim 17, wherein the method further includes:

acquiring the bad block table, and acquiring, according to the bad block table, information about the bad block in the virtual memory block to which the strip belongs; and determining, based on the bad block table, not to write data to the bad block in the virtual memory block to which the strip belongs.

20. The operation method of the memory system of claim 15, wherein the method further includes, when the memory data stored in one physical page of the strip is lost, performing a data recovery operation on the lost memory data of the strip by using the parity check data in the strip and the memory data stored in other physical pages of the strip.

\* \* \* \* \*